(12) United States Patent
Kim et al.

(10) Patent No.: US 12,535,950 B2
(45) Date of Patent: Jan. 27, 2026

(54) MEMORY DEVICE COMPRESSING SOFT DECISION DATA AND OPERATING METHOD THEREOF

(71) Applicant: Samsung Electronics Co., Ltd., Suwon-si (KR)

(72) Inventors: Suyong Kim, Suwon-si (KR); Ilhan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 18/610,556

(22) Filed: Mar. 20, 2024

(65) Prior Publication Data

US 2024/0319874 A1 Sep. 26, 2024

(30) Foreign Application Priority Data

Mar. 24, 2023 (KR) ........................ 10-2023-0038969
Jun. 20, 2023 (KR) ........................ 10-2023-0078852

(51) Int. Cl.
*G06F 3/06* (2006.01)

(52) U.S. Cl.
CPC .......... *G06F 3/0608* (2013.01); *G06F 3/0656* (2013.01); *G06F 3/0679* (2013.01)

(58) Field of Classification Search
CPC ..... G06F 3/0608; G06F 3/0656; G06F 3/0679
See application file for complete search history.

(56) References Cited

U.S. PATENT DOCUMENTS

| | | | |
|---|---|---|---|
| 9,146,807 B2 | 9/2015 | Yurzola et al. | |
| 9,858,994 B2 | 1/2018 | Berman et al. | |
| 11,456,758 B1 | 9/2022 | Zamir et al. | |
| 2008/0228998 A1 | 9/2008 | Colecchia et al. | |
| 2012/0130928 A1* | 5/2012 | Bell, Jr. ................ | G06N 3/126 706/12 |
| 2020/0274552 A1* | 8/2020 | Rigo ................... | H03M 7/6023 |
| 2022/0091752 A1 | 3/2022 | Singla et al. | |
| 2022/0129163 A1 | 4/2022 | Sravan et al. | |
| 2022/0164143 A1 | 5/2022 | Kim et al. | |
| 2023/0034098 A1 | 2/2023 | Tishbi | |
| 2023/0142767 A1* | 5/2023 | Nakanishi ............ | G06F 3/0631 711/154 |
| 2023/0402071 A1* | 12/2023 | Park .................... | G11C 11/5671 |
| 2024/0078038 A1* | 3/2024 | Li ......................... | G06F 3/0679 |

* cited by examiner

*Primary Examiner* — Hiep T Nguyen
(74) *Attorney, Agent, or Firm* — Wolf, Greenfield & Sacks, P.C.

(57) ABSTRACT

A memory device includes a first memory cell array and a second memory cell array, a first page buffer and a second page buffer configured to read data from the first memory cell array and the second memory cell array, respectively; and a first compression circuit configured to compress first soft decision data into first compressed data by encoding a location of a bit having a first value among bits of the first soft decision data, the first soft decision data being obtained from the first memory cell array by using a plurality of soft read voltages, wherein the first compression circuit is further configured to compress the first soft decision data into the first compressed data while second hard decision data is being output, the second hard decision data being read from the second memory cell array by using a hard read voltage.

18 Claims, 31 Drawing Sheets

FIG. 14

| DQ<br>B | <0> | <1> | <2> | <3> | <4> | <5> | <6> | <7> |
|---|---|---|---|---|---|---|---|---|
| 1st | 0x00 | 0x01 | 0x02 | 0x03 | 0x04 | 0x05 | 0x06 | 0x07 |
| 2nd | 0x08 | 0x09 | 0x0A | 0x0B | 0x0C | 0x0D | 0x0E | 0x0F |
| 3rd | 0x10 | 0x11 | 0x12 | 0x13 | 0x14 | 0x15 | 0x16 | 0x17 |
| 4th | 0x18 | 0x19 | 0x1A | 0x1B | 0x1C | 0x1D | 0x1E | 0x1F |
| 5th | 0x20 | 0x21 | 0x22 | 0x23 | 0x24 | 0x25 | 0x26 | 0x27 |
| 6th | 0x28 | 0x29 | 0x2A | 0x2B | 0x2C | 0x2D | 0x2E | 0x2F |
| 7th | 0x30 | 0x31 | 0x32 | 0x33 | 0x34 | 0x35 | 0x36 | 0x37 |
| 8th | 0x38 | 0x39 | 0x3A | 0x3B | 0x3C | 0x3D | 0x3E | 0x3F |
| 9th | 0x40 | 0x41 | 0x42 | 0x43 | 0x44 | 0x45 | 0x46 | 0x47 |
| 10th | 0x48 | 0x49 | 0x4A | 0x4B | 0x4C | 0x4D | 0x4E | 0x4F |
| 11th | 0x50 | 0x51 | 0x52 | 0x53 | 0x54 | 0x55 | 0x56 | 0x57 |
| 12th | 0x58 | 0x59 | 0x5A | 0x5B | 0x5C | 0x5D | 0x5E | 0x5F |
| 13th | 0x60 | 0x61 | 0x62 | 0x63 | 0x64 | 0x65 | 0x66 | 0x67 |
| 14th | 0x68 | 0x69 | 0x6A | 0x6B | 0x6C | 0x6D | 0x6E | 0x6F |
| 15th | 0x70 | 0x71 | 0x72 | 0x73 | 0x74 | 0x75 | 0x76 | 0x77 |
| 16th | 0x78 | 0x79 | 0x7A | 0x7B | 0x7C | 0x7D | 0x7E | 0x7F |

Location mapping table

FIG. 15D

| DQ B | <0> | <1> | <2> | <3> | <4> | <5> | <6> | <7> |
|---|---|---|---|---|---|---|---|---|
| 1st | 0 | 0 | 0 | 0 | 0 | 0 | 0 | 0 |
| 2nd | 0 | 0 | 0 | 0 | 0 | 0 | 0 | 0 |
| 3rd | 0 | 0 | 0 | 0 | 0 | 0 | 0 | 0 |
| 4th | 0 | 0 | 0 | 0 | 0 | 0 | 0 | 0 |
| 5th | 0 | 0 | 0 | 0 | 0 | 0 | 0 | 0 |
| 6th | 0 | 0 | 0 | 0 | 0 | 0 | 0 | 0 |
| 7th | 0 | 0 | 0 | 0 | 0 | 0 | 0 | 0 |
| 8th | 0 | 0 | 0 | 0 | 0 | 0 | 0 | 0 |
| 9th | 0 | 0 | 0 | 0 | 0 | 0 | 0 | 0 |
| 10th | 0 | 0 | 0 | 0 | 0 | 0 | 0 | 0 |
| 11th | 0 | 0 | 0 | 0 | 0 | 0 | 0 | 0 |
| 12th | 0 | 0 | 0 | 0 | 0 | 0 | 0 | 0 |
| 13th | 0 | 0 | 0 | 0 | 0 | 0 | 0 | 0 |
| 14th | 0 | 0 | 0 | 0 | 0 | 0 | 0 | 0 |
| 15th | 0 | 0 | 0 | 0 | 0 | 0 | 0 | 0 |
| 16th | 0 | 0 | 0 | 0 | 0 | 0 | 0 | 0 |

SD_SG_SUB

COMPRESSION ⇒ 0x7F(0111 1111)

COMP_SD_SG_SUB

FIG. 16B

| DQ<br>B | <0> | <1> | <2> | <3> | <4> | <5> | <6> | <7> |
|---|---|---|---|---|---|---|---|---|
| 1st | 0 | 0 | 0 | 0 | 0 | 0 | 0 | 0 |
| 2nd | 0 | 0 | 0 | 0 | 0 | 0 | 0 | 0 |
| 3rd | 0 | 0 | 0 | 0 | 0 | 0 | 0 | 0 |
| 4th | 0 | 0 | 0 | 0 | 0 | 0 | 0 | 0 |
| 5th | 0 | 0 | 0 | 0 | 0 | 0 | 0 | 0 |
| 6th | 0 | 0 | 0 | 0 | 0 | 0 | 0 | 0 |
| 7th | 0 | 0 | 0 | 0 | 0 | 0 | 0 | 0 |
| 8th | 0 | 0 | 0 | 0 | 0 | 0 | 0 | 0 |
| 9th | 0 | 0 | 0 | 0 | 0 | 0 | 0 | 0 |
| 10th | 0 | 0 | 0 | 0 | 0 | 0 | 0 | 0 |
| 11th | 0 | 0 | 0 | 0 | 0 | 0 | 0 | 0 |
| 12th | 0 | 0 | 0 | 0 | 0 | 0 | 0 | 0 |
| 13th | 0 | 0 | 0 | 0 | 0 | 0 | 0 | 0 |
| 14th | 0 | 0 | 0 | 0 | 0 | 0 | 0 | 0 |
| 15th | 0 | 0 | 0 | 0 | 0 | 0 | 0 | 0 |
| 16th | 0 | 0 | 0 | 0 | 0 | 0 | 0 | 0 |

SD_SG_SUB

COMPRESSION ⇒ 0xFF(1111 1111)

COMP_SD_SG_SUB

FIG. 19

| DQ<br>B | <0> | <1> | <2> | <3> | <4> | <5> | <6> | <7> |
|---|---|---|---|---|---|---|---|---|
| 1st | 0x00 | 0x01 | 0x02 | 0x03 | 0x04 | 0x05 | 0x06 | 0x07 |
| 2nd | 0x08 | 0x09 | 0x0A | 0x0B | 0x0C | 0x0D | 0x0E | 0x0F |
| 3rd | 0x10 | 0x11 | 0x12 | 0x13 | 0x14 | 0x15 | 0x16 | 0x17 |
| 4th | 0x18 | 0x19 | 0x1A | 0x1B | 0x1C | 0x1D | 0x1E | 0x1F |
| 5th | 0x20 | 0x21 | 0x22 | 0x23 | 0x24 | 0x25 | 0x26 | 0x27 |
| 6th | 0x28 | 0x29 | 0x2A | 0x2B | 0x2C | 0x2D | 0x2E | 0x2F |
| 7th | 0x30 | 0x31 | 0x32 | 0x33 | 0x34 | 0x35 | 0x36 | 0x37 |
| 8th | 0x38 | 0x39 | 0x3A | 0x3B | 0x3C | 0x3D | 0x3E | 0x3F |
| 9th | 0x40 | 0x41 | 0x42 | 0x43 | 0x44 | 0x45 | 0x46 | 0x47 |
| 10th | 0x48 | 0x49 | 0x4A | 0x4B | 0x4C | 0x4D | 0x4E | 0x4F |
| 11th | 0x50 | 0x51 | 0x52 | 0x53 | 0x54 | 0x55 | 0x56 | 0x57 |
| 12th | 0x58 | 0x59 | 0x5A | 0x5B | 0x5C | 0x5D | 0x5E | 0x5F |
| 13th | 0x60 | 0x61 | 0x62 | 0x63 | 0x64 | 0x65 | 0x66 | 0x67 |
| 14th | 0x68 | 0x69 | 0x6A | 0x6B | 0x6C | 0x6D | 0x6E | 0x6F |
| 15th | 0x70 | 0x71 | 0x72 | 0x73 | 0x74 | 0x75 | 0x76 | 0x77 |
| 16th | 0x78 | 0x79 | 0x7A | 0x7B | 0x7C | 0x7D | 0x7E | 0x7F |
| 17th | 0x80 | 0x81 | 0x82 | 0x83 | 0x84 | 0x85 | 0x86 | 0x87 |
| 18th | 0x88 | 0x89 | 0x8A | 0x8B | 0x8C | 0x8D | 0x8E | 0x8F |
| 19th | 0x90 | 0x91 | 0x92 | 0x93 | 0x94 | 0x95 | 0x96 | 0x97 |
| 20th | 0x98 | 0x99 | 0x9A | 0x9B | 0x9C | 0x9D | 0x9E | 0x9F |
| 21st | 0xA0 | 0xA1 | 0xA2 | 0xA3 | 0xA4 | 0xA5 | 0xA6 | 0xA7 |
| 22nd | 0xA8 | 0xA9 | 0xAA | 0xAB | 0xAC | 0xAD | 0xAE | 0xAF |
| 23rd | 0xB0 | 0xB1 | 0xB2 | 0xB3 | 0xB4 | 0xB5 | 0xB6 | 0xB7 |
| 24th | 0xB8 | 0xB9 | 0xBA | 0xBB | 0xBC | 0xBD | 0xBE | 0xBF |
| 25th | 0xC0 | 0xC1 | 0xC2 | 0xC3 | 0xC4 | 0xC5 | 0xC6 | 0xC7 |
| 26th | 0xC8 | 0xC9 | 0xCA | 0xCB | 0xCC | 0xCD | 0xCE | 0xCF |
| 27th | 0xD0 | 0xD1 | 0xD2 | 0xD3 | 0xD4 | 0xD5 | 0xD6 | 0xD7 |
| 28th | 0xD8 | 0xD9 | 0xDA | 0xDB | 0xDC | 0xDD | 0xDE | 0xDF |
| 29th | 0xE0 | 0xE1 | 0xE2 | 0xE3 | 0xE4 | 0xE5 | 0xE6 | 0xE7 |
| 30th | 0xE8 | 0xE9 | 0xEA | 0xEB | 0xEC | 0xED | 0xEE | 0xEF |
| 31st | 0xF0 | 0xF1 | 0xF2 | 0xF3 | 0xF4 | 0xF5 | 0xF6 | 0xF7 |
| 32nd | 0xF8 | 0xF9 | 0xFA | 0xFB | 0xFC | 0xFD | 0xFE | 0xFF |

Location mapping table

MEMORY DEVICE COMPRESSING SOFT DECISION DATA AND OPERATING METHOD THEREOF

CROSS-REFERENCE TO RELATED APPLICATIONS

This application is based on and claims priority under 35 U.S.C. § 119 to Korean Patent Application Nos. 10-2023-0038969, filed on Mar. 24, 2023, and 10-2023-0078852, filed on Jun. 20, 2023, in the Korean Intellectual Property Office, the disclosures of which are incorporated by reference herein in their entireties.

BACKGROUND

The inventive concept relates to a memory device, and more particularly, to a memory device compressing soft decision data and an operating method thereof.

Non-volatile memory devices may read hard decision data based on a hard read voltage, and may generate soft decision data by using read values based on a plurality of soft read voltages.

Soft decision data may include information indicating the reliability of hard decision data. Memory controllers may perform error correction based on hard decision data and soft decision data.

SUMMARY

The inventive concept provides a memory device compressing soft decision data by encoding the location of "1" in the soft decision data and an operating method thereof.

According to an aspect of the inventive concept, there is provided a memory device including a first memory cell array and a second memory cell array, a first page buffer and a second page buffer configured to read data from the first memory cell array and the second memory cell array, respectively; and a first compression circuit configured to compress first soft decision data into first compressed data by encoding a location of a bit having a first value among bits of the first soft decision data, the first soft decision data being obtained from the first memory cell array by using a plurality of soft read voltages, wherein the first compression circuit is further configured to compress the first soft decision data into the first compressed data while second hard decision data is being output, the second hard decision data being read from the second memory cell array by using a hard read voltage.

According to another aspect of the inventive concept, there is provided an operating method of a memory device. The operating method includes reading first hard decision data from a first memory cell array, generating second compressed data by compressing second soft decision data obtained from a second memory cell array, while outputting the first hard decision data through an input/output (I/O) pin, outputting the second compressed data through the I/O pin after outputting the first hard decision data, reading second hard decision data from the second memory cell array, generating first compressed data by compressing first soft decision data obtained from the first memory cell array, while outputting the second hard decision data through the I/O pin, and outputting the first compressed data through the I/O pin after outputting the second hard decision data.

According to a further aspect of the inventive concept, there is provided a memory system including a memory device configured to generate second compressed data by compressing second soft decision data obtained from a second memory cell array, while outputting first hard decision data read from a first memory cell array, output the second compressed data after outputting the first hard decision data, generate first compressed data by compressing first soft decision data obtained from the first memory cell array, while outputting second hard decision data read from the second memory cell array, and output the first compressed data after outputting the second hard decision data and a memory controller configured to receive the first hard decision data, the second hard decision data, the first compressed data, and the second compressed data, obtain the first soft decision data by decompressing the first compressed data, correct an error in the first hard decision data based on the first hard decision data and the first soft decision data, and correct an error in the second hard decision data based on the second hard decision data and the second soft decision data.

BRIEF DESCRIPTION OF THE DRAWINGS

Embodiments will be more clearly understood from the following detailed description taken in conjunction with the accompanying drawings in which:

FIG. 2 is a block diagram of an example of a non-volatile memory device according to;

FIG. 14 is a diagram illustrating a location mapping table according to some embodiments;

FIGS. 15A to 15D are diagrams illustrating a method of compressing a soft decision data sub segment according to some embodiments;

FIGS. 16A and 16B are diagrams illustrating a method of compressing a soft decision data sub segment according to some embodiments;

FIG. 19 is a diagram illustrating a location mapping table according to some embodiments;

DETAILED DESCRIPTION OF THE EMBODIMENTS

Figure 1:
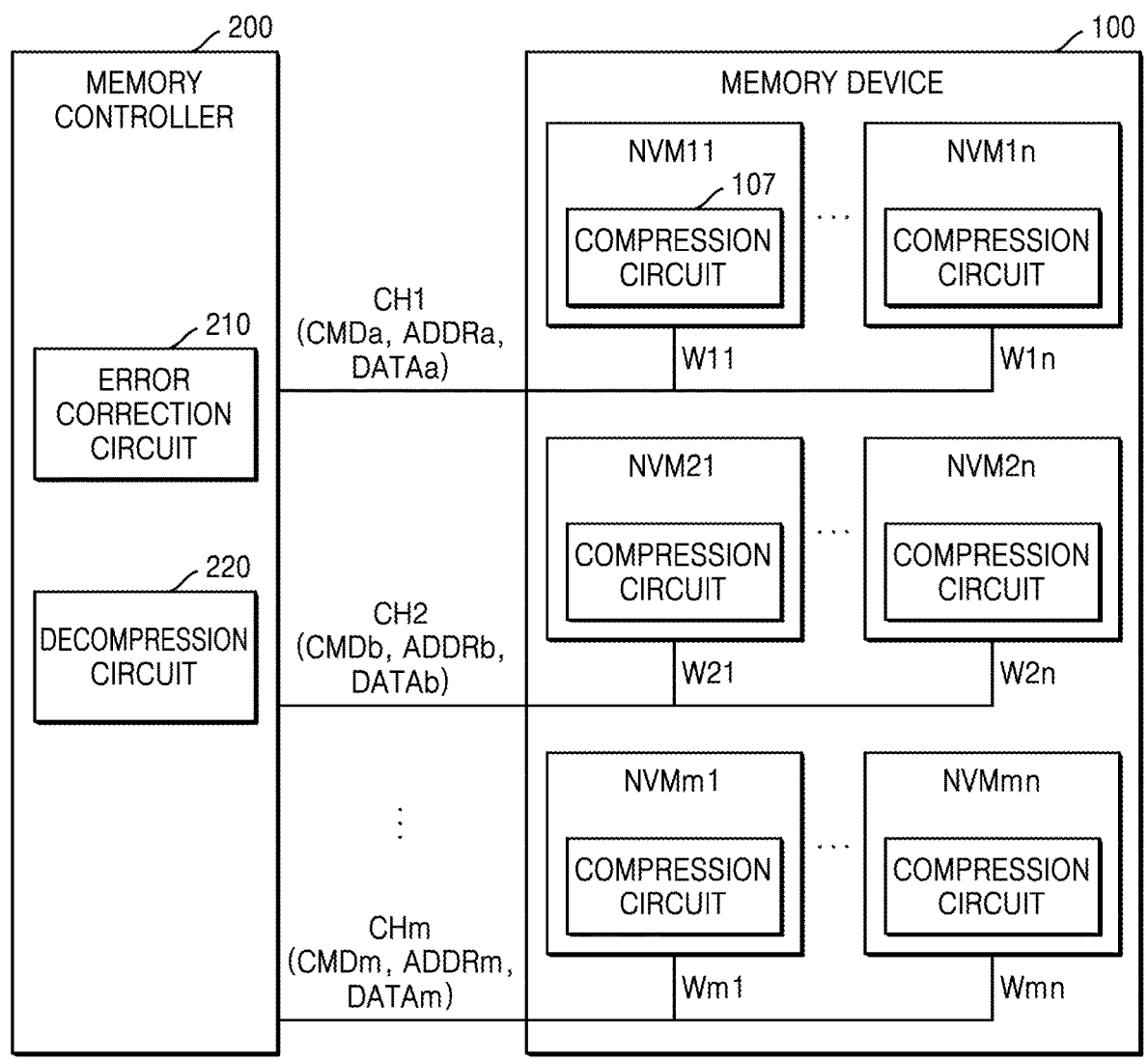
FIG. 1 is a block diagram of a memory system according to some embodiments.

Hereinafter, various embodiments are described with reference to the accompanying drawings. The same reference numerals are used for the same components in the drawings, and redundant descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram of a memory system according to some embodiments.

Referring to FIG. 1, a memory system 1 may include a memory device 100 and a memory controller 200. The memory system 1 may support a plurality of channels CH1 to CHm, and the memory device 100 and the memory controller 200 may be connected to each other through the channels CH1 to CHm. For example, the memory system 1 may correspond to a storage device, such as a solid state drive (SSD).

The memory device 100 may include the non-volatile memory devices NVM11 to NVMmn. Each of the non-volatile memory devices NVM11 to NVMmn may be connected to one of the channels CH1 to CHm through a corresponding way among a plurality of ways W11 to Wmn. For example, the non-volatile memory devices NVM11 to NVM1n may be connected to the channel CH1 through the ways W11 to W1n, respectively, and the non-volatile memory devices NVM21 to NVM2n may be connected to the channel CH2 through ways W21 to W2n, respectively. In an embodiment, each of the non-volatile memory devices NVM11 to NVMmn may be implemented in a certain memory unit, which may operate according to an individual command received from the memory controller 200. For example, each of the non-volatile memory devices NVM11 to NVMmn may be implemented in a chip or a die. However, embodiments are not limited thereto.

The memory controller 200 may exchange signals with the memory device 100 through the channels CH1 to CHm. For example, the memory controller 200 may transmit commands CMDa to CMDm, addresses ADDRa to ADDRm, and data DATAa to DATAm to the memory device 100 through the channels CH1 to CHm and receive the DATAa to DATAm from the memory device 100 through the channels CH1 to CHm.

The memory controller 200 may select one of the non-volatile memory devices connected to their corresponding channel and exchange signals with the selected non-volatile memory device through the corresponding channel. For example, the memory controller 200 may select the non-volatile memory device NVM11 among the non-volatile memory devices NVM11 to NVM In connected to the channel CH1. The memory controller 200 may transmit the command CMDa, the address ADDRa, and the data DATAa to the non-volatile memory device NVM11 or receive the data DATAa from the non-volatile memory device NVM11 through the channel CH1.

The memory controller 200 may exchange signals in parallel with the memory device 100 through different channels. For example, while the memory controller 200 is transmitting the command CMDa to the memory device 100 through the channel CH1, the memory controller 200 may transmit the command CMDb to the memory device 100 through the channel CH2. For example, while the memory controller 200 is receiving the data DATAa from the memory device 100 through the channel CH1, the memory controller 200 may receive the data DATAb from the memory device 100 through the channel CH2.

The memory controller 200 may generally control the operations of the memory device 100. The memory controller 200 may transmit signals to the channels CH1 to CHm and thus individually control the non-volatile memory devices NVM11 to NVMmn connected to the channels CH1 to CHm. For example, the memory controller 200 may transmit the command CMDa and the address ADDRa to the channel CH1 and thus control a non-volatile memory device selected from the non-volatile memory devices NVM11 to NVM1n.

Each of the non-volatile memory devices NVM11 to NVMmn may operate under the control of the memory controller 200. For example, the non-volatile memory device NVM11 may program the data DATAa according to the command CMDa, the address ADDRa, and the data DATAa, which are provided to the channel CH1. For example, the non-volatile memory device NVM21 may read the data DATAb according to the command CMDb and the address ADDRb, which are provided to the channel CH2, and transmit the data DATAb to the memory controller 200.

Although it is illustrated in FIG. 1 that the memory device 100 communicates with the memory controller 200 through "m" channels and the memory device 100 includes "n" non-volatile memory devices in correspondence to each channel, the number of channels and the number of non-volatile memory devices connected to each channel may be variously changed in accordance with different embodiments.

The memory controller 200 may include an error correction circuit 210 that corrects an error in data read from the memory device 100. A hard decision method and a soft decision method may be used as an error correction method of the error correction circuit 210.

The hard decision method may correct an error in data by using error correction codes and data (hereinafter, referred to as hard decision data), which is read from a memory cell according to the on/off characteristic of the memory cell when a certain reference voltage (hereinafter, referred to as a hard read voltage) is applied to the memory cell.

The soft decision method may correct an error in data by further using additional information (hereinafter, referred to as soft decision data) about the reliability of hard decision data in addition to the hard decision data and error correction codes.

The memory controller 200 may provide a read command to the memory device 100 with respect to hard decision data and soft decision data. The memory device 100 may provide the memory controller 200 with hard decision data obtained from a non-volatile memory device selected from among the non-volatile memory devices NVM11 to NVMmn. The memory device 100 may compress soft decision data obtained from the selected non-volatile memory device and provide compressed data to the memory controller 200.

The memory controller 200 may include a decompression circuit 220. The decompression circuit 220 may generate soft decision data by decompressing the compressed data and provide the soft decision data to the error correction circuit 210. The error correction circuit 210 may correct an error in the hard decision data, based on the hard decision data and the soft decision data. For example, the error correction circuit 210 may correct the hard decision data by changing a log likelihood ratio (LLR) based on the soft decision data, but embodiments are not limited thereto.

In some embodiments, soft decision data may represent an overlapping region between adjacent threshold voltage distributions as "1" and represent other regions as "0". The reliability of hard decision data may be relatively low in the overlapping region between threshold voltage distributions. The reliability of hard decision data may be relatively high in the other regions. Because the overlapping region between adjacent threshold voltage distributions is narrower than the other regions, the number of 1s in the soft decision data may be less than the number of 0s in the soft decision data.

Accordingly, a compression circuit 107 included in each of the non-volatile memory devices NVM11 to NVMmn may generate compressed data by encoding "1" in soft decision data into the location of "1".

Non-volatile memory devices sharing the same channel with each other may perform output of hard decision data and compression of soft decision data in parallel. For example, while some of the non-volatile memory devices NVM11 to NVM1n sharing the channel CH1 are outputting hard decision data to the memory controller 200 through the channel CH1, the others of the non-volatile memory devices NVM11 to NVM1n may compress soft decision data. When the output of the hard decision data is completed, the other non-volatile memory devices may provide compressed data to the memory controller 200 through the channel CH1. Because the compression of soft decision data is performed in parallel with the output of hard decision data and the compressed data is output after the output of hard decision data ends, a read time, during which the hard decision data and the soft decision data is provided to the memory controller 200, may be reduced.

Figure 2:
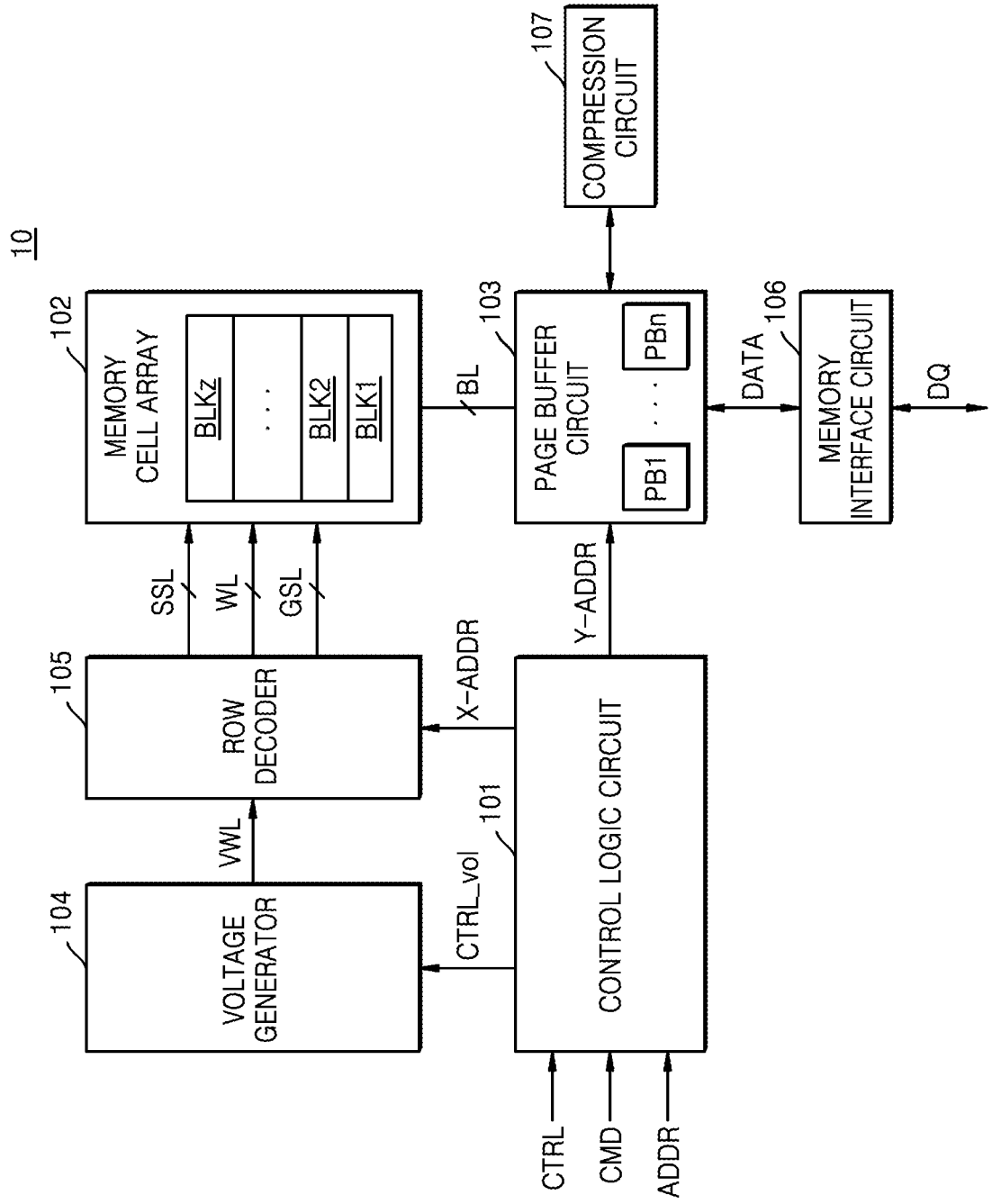

FIG. 2 is a block diagram of an example of a non-volatile memory device.

A non-volatile memory device 10 of FIG. 2 may correspond to at least one of the non-volatile memory devices NVM11 to NVMmn in FIG. 1.

Referring to FIG. 2, the non-volatile memory device 10 may include a control logic circuit 101, a memory cell array 102, a page buffer circuit 103, a voltage generator 104, a row decoder 105, a memory interface circuit 106, and a compression circuit 107. Although not shown in FIG. 2, the non-volatile memory device 10 may further include a column logic, a pre-decoder, a temperature sensor, a command decoder, an address decoder, or the like.

The control logic circuit 101 may generally control various operations of the non-volatile memory device 10. The control logic circuit 101 may output various control signals in response to a command CMD, control signal (CTRL), and/or an address ADDR each received from the memory interface circuit 106. For example, the control logic circuit 101 may output a voltage control signal CTRL_vol, a row address X-ADDR, and a column address Y-ADDR.

The memory cell array 102 may include a plurality of memory blocks BLK1 to BLKz, where "z" is a positive integer. Each of the memory blocks BLK1 to BLKz may include a plurality of memory cells. The memory cell array 102 may be connected to the page buffer circuit 103 through bit lines BL and to the row decoder 105 through word lines WL, string select lines SSL, and ground select lines GSL. The number of memory cell arrays included in the non-volatile memory device 10 is not limited to the present embodiment.

In an embodiment, the memory cell array 102 may include a three-dimensional (3D) memory cell array, which may include a plurality of NAND strings. Each NAND string may include memory cells respectively connected to word lines vertically stacked on a substrate. The disclosures of U.S. Pat. Nos. 7,679,133, 8,553,466, 8,654,587, 8,559,235, and U.S. Patent Application No. 2011/0233648 are incorporated herein in their entirety by reference. In an embodiment, the memory cell array 102 may include a two-dimensional (2D) memory cell array, which may include a plurality of NAND strings in rows and columns.

The page buffer circuit 103 may include a plurality of page buffers PB1 to PBn, where "n" is an integer of at least 3. The page buffers PB1 to PBn may be respectively connected to memory cells through the bit lines BL. The page buffer circuit 103 may select at least one of the bit lines BL in response to the column address Y-ADDR. The page buffer circuit 103 may operate as a write driver or a sense amplifier according to an operation mode. For example, in a program operation, the page buffer circuit 103 may apply a bit line voltage, which corresponds to data to be programmed, to the selected bit line. In a read operation, the page buffer circuit 103 may sense data stored in a memory cell by sensing the current or voltage of the selected bit line.

The page buffer circuit 103 may obtain hard decision data or soft decision data from the memory cell array 102. The compression circuit 107 may generate compressed data by compressing the soft decision data per each unit size. The compression circuit 107 may sequentially generate compressed data segments by compressing soft decision data segments each having a unit size and may store the compressed data segments in the page buffer circuit 103. When the soft decision data has been compressed, compressed data may be output to a DQ pin through the memory interface circuit 106. Herein, the DQ pin may be referred to as an input/output (I/O) pin.

The compression circuit 107 may generate compressed data by encoding the location of a bit representing a minor value among the bits of soft decision data. A compression method is described in detail with reference to FIGS. 13A to 20 below. Herein, a minor value is assumed to be "1", but embodiments are not limited thereto. A minor value may correspond to an overlapping region between adjacent threshold voltage distributions and a major value may correspond to the other regions.

The voltage generator 104 may generate various kinds of voltages for performing program, read, and erase operations based on the voltage control signal CTRL_vol. The voltage generator 104 may generate a program voltage, a read voltage, a program verify voltage, or an erase voltage as a word line voltage VWL.

The row decoder 105 may select one of the word lines WL and one of the string select lines SSL in response to the row address X-ADDR. For example, the row decoder 105 may apply a program voltage and a program verify voltage to the selected word line in a program operation and may apply a read voltage to the selected word line in a read operation.

The memory interface circuit 106 may transmit and receive data through a DQ pin.

Figure 3:
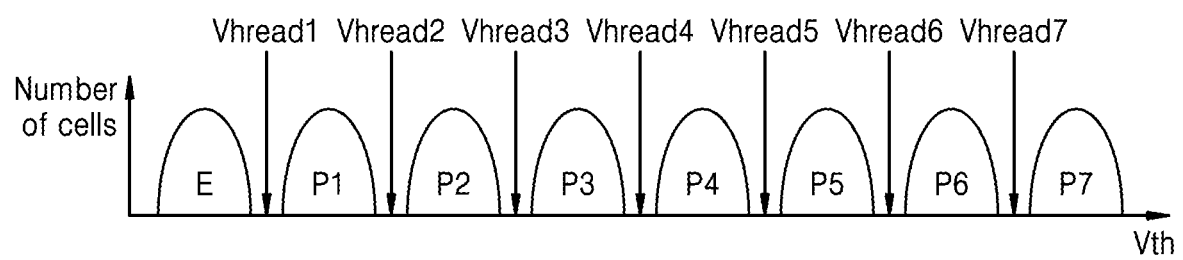
FIG. 3 is a diagram illustrating ideal threshold voltage distributions of triple-level cells (TLCs)

FIG. 3 is a diagram illustrating ideal threshold voltage distributions of triple-level cells (TLCs).

Referring to FIGS. 2 and 3, when the non-volatile memory device 10 corresponds to a TLC memory device, which may store three bits in each memory cell of the memory cell array 102, the threshold voltage of each memory cell may be programmed to one of eight threshold voltages to program three bits in the memory cell. However, because there is an electrical characteristic difference between memory cells programmed to have the same threshold voltage, threshold voltages of memory cells programmed to have the same threshold voltage may form threshold voltage distributions in FIG. 3. Accordingly, in the case of a TLC memory device, eight threshold voltage distributions E and P1 to P7 may be formed.

When the threshold voltage distributions of the memory cell array 102 are in an ideal state, as shown in FIG. 3, read data with a small error may be obtained by performing a read operation by using hard read voltages Vhread1 to Vhread7 in FIG. 3 and error correction decoding may be highly likely to be successful. Herein, a read operation using the hard read voltages Vhread1 to Vhread7 may be referred to as a hard decision read operation. A hard decision read operation may be referred to as a normal read operation. A hard decision read operation may refer to an operation of reading data of a memory cell as 1 or 0 according to the on- or off-state of the memory cell when the hard read voltages Vhread1 to Vhread7 are applied to the word line of the memory cell.

A threshold voltage distribution may degrade as operations are repeatedly performed on the memory cell array 102.

Figure 4:
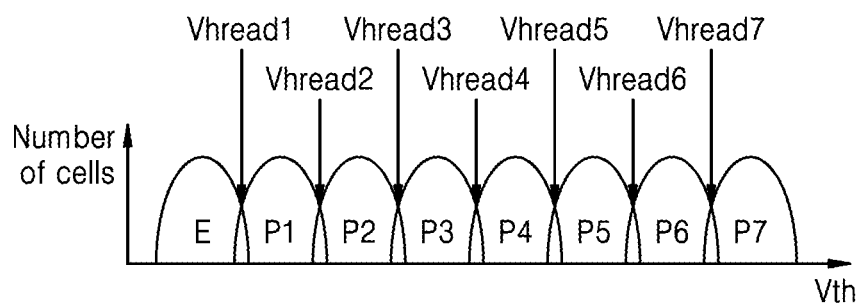
FIG. 4 is a diagram illustrating degraded threshold voltage distributions of TLCs.

FIG. 4 is a diagram illustrating degraded threshold voltage distributions of TLCs.

Referring to FIG. 4, a threshold voltage distribution may shift to the left or right according to a charge loss caused by emission of electrons from memory cells of the memory cell array 102 over time. Accordingly, the threshold voltage distributions of an erase state E and seven program states P1 to P7 may overlap with each other.

When threshold voltage distributions overlap with each other and a read operation is performed using any one of the hard read voltages Vhread1 to Vhread7, an uncorrectable error correction code (UECC) error may occur due to many error bits.

For example, when the hard read voltage Vhread1 is used, on-cells in the erase state E are supposed to be distinguished from off-cells in the program state P1. However, when distributions of memory cells overlap with each other as shown in FIG. 4, there may be a memory cell that is read as an off-cell even through the memory cell is actually an on-cell and there may be a memory cell that is read as an on-cell even though the memory cell is actually an off-cell.

Accordingly, in the case where threshold voltage distributions are as shown in FIG. 4, when a read operation is performed using the hard read voltages Vhread1 to Vhread7, the memory controller 200 may receive hard decision data having many errors, and thus, error correction decoding may be highly likely to fail.

Therefore, the memory controller 200 may obtain soft decision data through a soft decision read operation and may perform error correction decoding based on the soft decision data. Soft decision data may represent the reliability of hard decision data by distinguishing an overlapping region between threshold voltage distributions and the other regions thereof.

Figure 5:
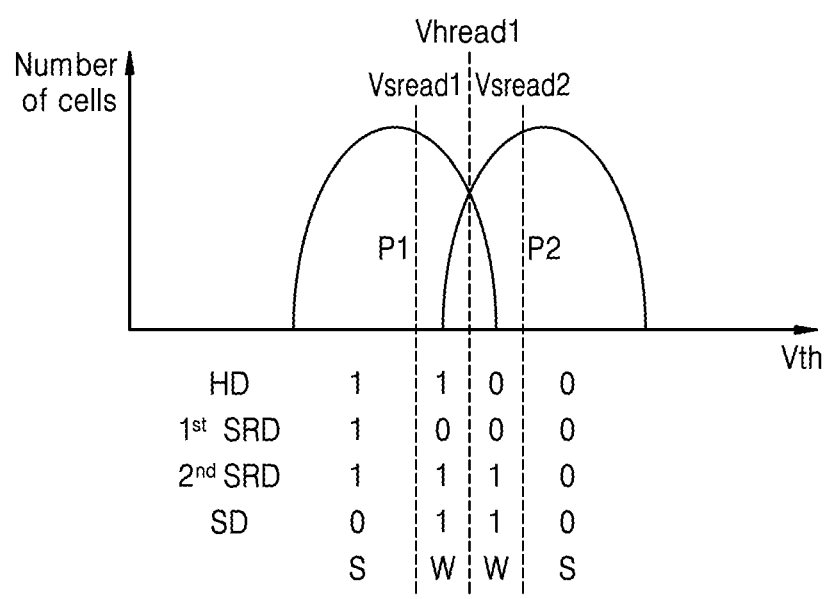
FIG. 5 is a diagram illustrating a soft decision read operation.

FIG. 5 is a diagram illustrating a soft decision read operation.

As shown in FIG. 5, soft read voltages Vsread1 and Vsread2 may be used in a soft decision read operation. A soft decision read operation may refer to an operation of forming information, which adds reliability to the hard decision data HD, by applying multiple soft read voltages (e.g., Vsread1 and Vsread2) to a memory cell, wherein each of the soft read voltages has a certain voltage difference from the hard read voltage Vhread1. When the soft read voltage Vsread1 is applied to a memory cell, data $1^{st}$ SRD determined according to the on- or off-state of the memory cell may include 1, 0, 0, and 0. When the soft read voltage Vsread2 is applied to a memory cell, data $2^{nd}$ SRD determined according to the on- or off-state of the memory cell may include 1, 1, 1, and 0.

Soft decision data SD may be formed by performing an exclusive OR (XOR) operation on read values (i.e., $1^{st}$ SRD and $2^{nd}$ SRD) obtained through two read operations. As shown in FIG. 5, the soft decision data SD may include 0, 1, 1, and 0. The XOR operation may be performed by the page buffer circuit 103. In other words, the XOR operation may be performed on the read values (i.e., $1^{st}$ SRD and $2^{nd}$ SRD), which are obtained through two read operations, by using a plurality of latches of the page buffer circuit 103. The soft decision data SD may represent the reliability of the hard decision data HD. When the soft decision data SD is 0, it may mean that the reliability of hard decision data is high, i.e., strong (S). When the soft decision data SD is 1, it may mean that the reliability of hard decision data is low, i.e., weak (W). In other words, "10", "11", "01", and "00", which are combinations of the hard decision data HD, 1, 1, 0, and 0, and the soft decision data SD, 0, 1, 1, and 0, may respectively indicate the hard decision data HD "1" having a high reliability, the hard decision data HD "1" having a low reliability, the hard decision data HD "0" having a low reliability, and the hard decision data HD "0" having a high reliability.

Figure 6:
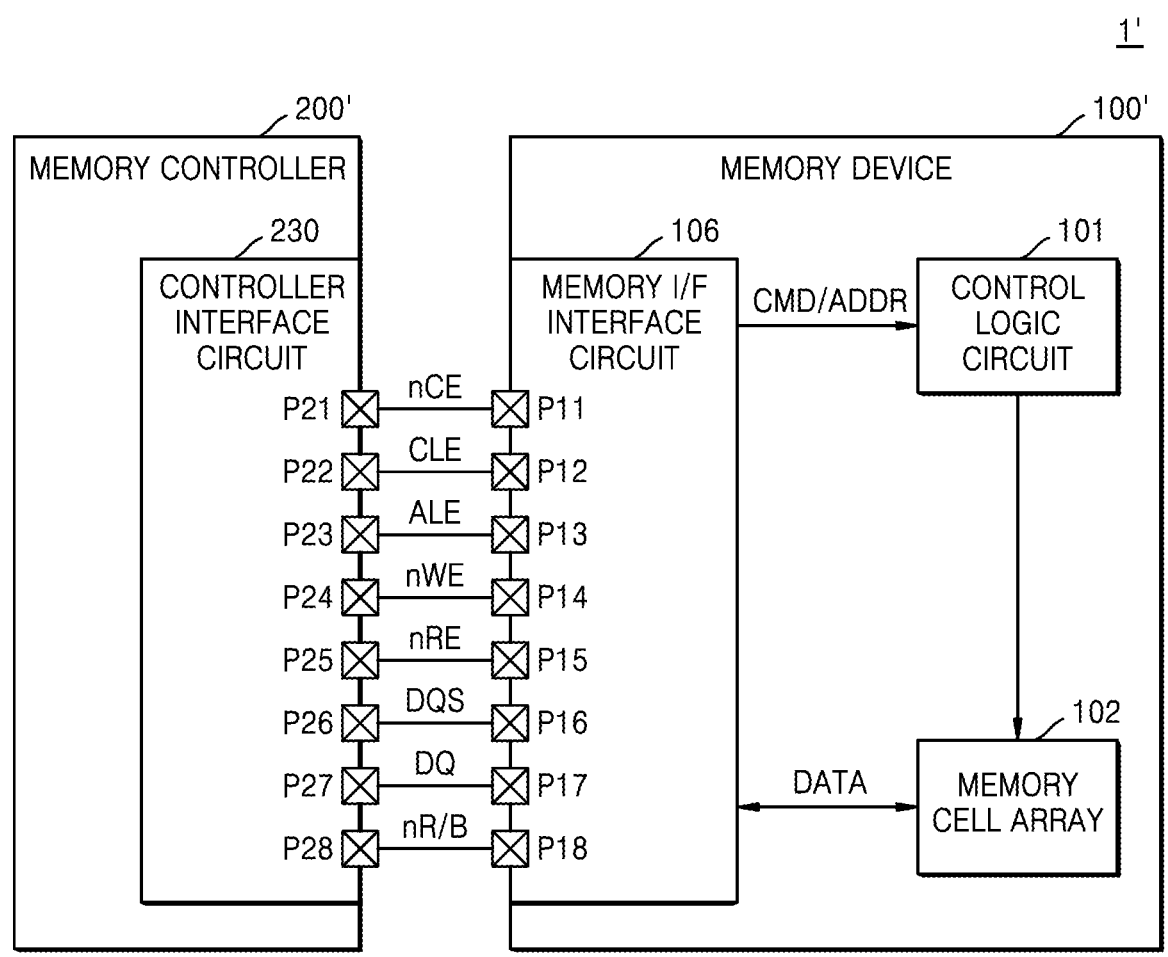
FIG. 6 is a block diagram of a memory system according to according to some embodiments.

FIG. 6 is a block diagram of a memory system according to some embodiments.

Referring to FIG. 6, a memory system 1' may include a memory device 100' and a memory controller 200'. The memory device 100' may correspond to one of the non-volatile memory devices NVM11 to NVMmn and may communicate with the memory controller 200' through one of the channels CH1 to CHm in FIG. 1. The memory controller 200' may correspond to the memory controller 200 in FIG. 1.

The memory device 100' may include first to eighth pins P11 to P18, a memory interface circuit 106, a control logic circuit 101, and a memory cell array 102.

The memory interface circuit 106 may receive a chip enable signal nCE from the memory controller 200' through the first pin P11. The memory interface circuit 106 may exchange signals with the memory controller 200' through the second to eighth pins P12 through P18 according to the chip enable signal nCE. For example, when the chip enable signal nCE is enabled (e.g., at a low level), the memory interface circuit 106 may exchange signals with the memory controller 200' through the second to eighth pins P12 to P18 according to the chip enable signal nCE.

Figure 7A:
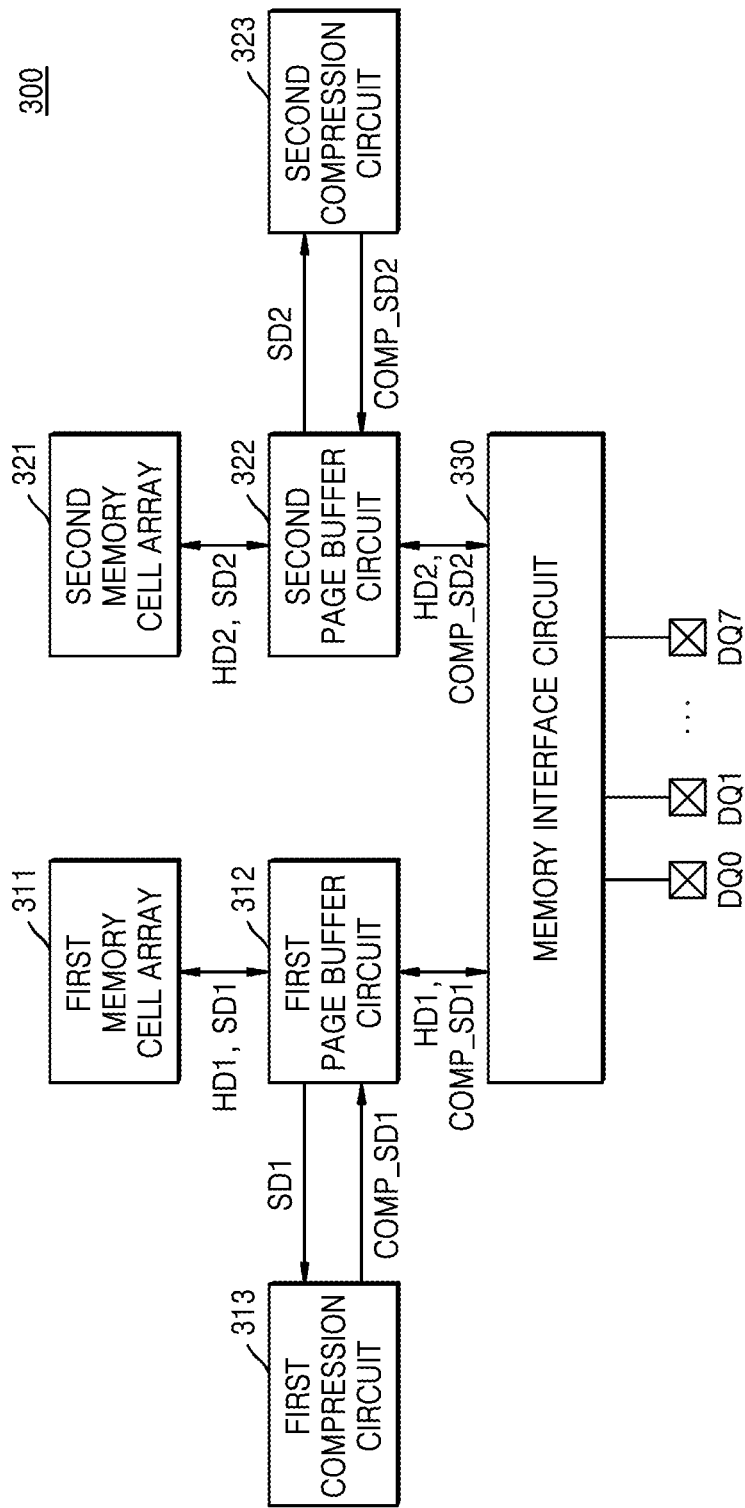
FIGS. 7A and 7B are diagrams illustrating a read operation according to according to some embodiments.

The memory interface circuit 106 may receive a command latch enable signal CLE, an address latch enable signal ALE, and a write enable signal nWE from the memory controller 200' through the second to fourth pins P12 to P14, respectively. The memory interface circuit 106 may receive or transmit a data signal DQ from or to the memory controller 200' through the seventh pin P17. A command CMD, an address ADDR, and data DATA may be transmitted through the data signal DQ. For example, the data signal DQ may be transmitted through a plurality of data signal lines. In this case, the seventh pin P17 may include a plurality of pins respectively corresponding to the data signal lines. For example, the memory device 100' may transmit the data DATA to the memory controller 200' through eight DQ pins, e.g., first to eighth DQ pins DQ0 to DQ7, as shown in FIG. 7A.

The memory interface circuit 106 may acquire the command CMD from the data signal DQ, which is received in an enable period (e.g., a high level state) of the command latch enable signal CLE, based on toggle timings of the write enable signal nWE. The memory interface circuit 106 may acquire the address ADDR from the data signal DQ, which is received in an enable period (e.g., a high level state) of the address latch enable signal ALE, based on the toggle timings of the write enable signal nWE.

In an embodiment, the write enable signal nWE may remain in a static state (e.g., a high level or a low level) and may toggle between the high level and the low level. For example, the write enable signal nWE may toggle in a period in which the command CMD or the address ADDR is transmitted. Accordingly, the memory interface circuit 106 may acquire the command CMD or the address ADDR, based on the toggle timings of the write enable signal nWE.

The memory interface circuit 106 may receive a read enable signal nRE from the memory controller 200' through the fifth pin P15. The memory interface circuit 106 may receive or transmit a data strobe signal DQS from or to the memory controller 200' through the sixth pin P16.

In a data output operation of the memory device 100', the memory interface circuit 106 may receive the read enable signal nRE, which toggles, through the fifth pin P15 before outputting the data DATA. The memory interface circuit 106 may generate the data strobe signal DQS toggling based on toggling of the read enable signal nRE. For example, the memory interface circuit 106 may generate the data strobe signal DQS that starts to toggle after a predefined delay (e.g., tDQSRE) based on the toggling start time of the read enable signal nRE. The memory interface circuit 106 may transmit the data signal DQ including the data DATA, based on toggle timings of the data strobe signal DQS. Accordingly, the data DATA may be transmitted to the memory controller 200' in alignment with the toggle timings of the data strobe signal DQS.

In a data input operation of the memory device 100', when the data signal DQ including the data DATA is received from the memory controller 200', the memory interface circuit 106 may receive the data strobe signal DQS, which toggles, from the memory controller 200' together with the data DATA. The memory interface circuit 1321 may acquire the data DATA from the data signal DQ, based on the toggle timings of the data strobe signal DQS. For example, the memory interface circuit 106 may acquire the data DATA by sampling the data signal DQ at rising and falling edges of the data strobe signal DQS.

The memory interface circuit 106 may transmit a ready/busy output signal nR/B to the memory controller 200' through the eighth pin P18. The memory interface circuit 106 may transmit state information of the memory device 100' to the memory controller 200' through the ready/busy output signal nR/B. When the memory device 100' is in a busy state (that is, when internal operations of the memory device 100' are being performed), the memory interface circuit 106 may transmit the ready/busy output signal nR/B indicating the busy state to the memory controller 200'. When the memory device 100' is in a ready state (that is, when internal operations of the memory device 100' are not performed or are completed), the memory interface circuit 106 may transmit the ready/busy output signal nR/B indicating the ready state to the memory controller 200'. For example, while the memory device 100' is reading the data DATA from the memory cell array 102 in response to a read command, the memory interface circuit 106 may transmit the ready/busy output signal nR/B indicating the busy state (e.g., a low level) to the memory controller 200'. For example, while the memory device 100' is programming the data DATA to the memory cell array 102 in response to a program command, the memory interface circuit 106 may transmit the ready/busy output signal nR/B indicating the busy state to the memory controller 200'.

The control logic circuit 101 may generally control various operations of the memory device 100'. The control logic circuit 101 may receive the command CMD and/or the address ADDR from the memory interface circuit 106. The control logic circuit 101 may generate control signals for controlling other elements of the memory device 100' according to the command CMD and/or the address ADDR. For example, the control logic circuit 101 may generate various control signals for programming the data DATA to the memory cell array 102 or reading the data DATA from the memory cell array 102.

The memory cell array 102 may store the data DATA from the memory interface circuit 106 under control by the control logic circuit 101. The memory cell array 102 may output the data DATA, which has been stored therein, to the memory interface circuit 106 under control by the control logic circuit 101.

The memory cell array 102 may include a plurality of memory cells. For example, the memory cells may include flash memory cells. However, embodiments are not limited thereto. The memory cells may include resistive random access memory (RRAM) cells, ferroelectric RAM (FRAM) cells, phase-change RAM (PRAM) cells, thyristor RAM (TRAM) cells, magnetic RAM (MRAM) cells, dynamic RAM (DRAM) cells, and/or flash memory cells. Hereinafter, embodiments will be described focusing on the case where the memory cells include NAND flash memory cells.

The memory controller 200' may include first through eighth pins P21 to P28 and a controller interface circuit 230. The first through eighth pins P21 to P28 may respectively correspond to the first through eighth pins P11 through P18 of the memory device 100'.

The controller interface circuit 230 may transmit the chip enable signal nCE to the memory device 100' through the first pin P21. The controller interface circuit 230 may exchange signals with the memory device 100' through the second through eighth pins P22 to P28 according to the chip enable signal nCE.

The controller interface circuit 230 may transmit the command latch enable signal CLE, the address latch enable signal ALE, and the write enable signal nWE to the memory device 100' through the second through fourth pins P22 to P24, respectively. The controller interface circuit 230 may transmit or receive the data signal DQ to or from the memory device 100' through the seventh pin P27.

The controller interface circuit 230 may transmit the data signal DQ, which includes the command CMD or the address ADDR, to the memory device 100' together with the write enable signal nWE, which toggles. The controller interface circuit 230 may transmit the data signal DQ including the command CMD to the memory device 100' by transmitting the command latch enable signal CLE, which is in the enable state, and transmit the data signal DQ including the address ADDR to the memory device 100' by transmitting the address latch enable signal ALE, which is in the enable state.

The controller interface circuit 230 may transmit the read enable signal nRE to the memory device 100' through the fifth pin P25. The controller interface circuit 230 may receive or transmit the data strobe signal DQS from or to the memory device 100' through the sixth pin P26.

In a data output operation of the memory device 100', the controller interface circuit 230 may generate and transmit the read enable signal nRE, which toggles, to the memory device 100'. For example, before the output of the data DATA, the controller interface circuit 230 may generate the read enable signal nRE, which is converted from a static state (e.g., a high level or a low level) into a toggling state. Accordingly, the memory device 100' may generate the data strobe signal DQS toggling based on the read enable signal nRE. The controller interface circuit 230 may receive the data signal DQ including the data DATA and the data strobe signal DQS, which toggles, from the memory device 100'. The controller interface circuit 230 may acquire the data DATA from the data signal DQ, based on the toggle timings of the data strobe signal DQS.

In a data input operation of the memory device 100', the controller interface circuit 230 may generate the data strobe signal DQS, which toggles. For example, before transmitting the data DATA, the controller interface circuit 230 may generate the data strobe signal DQS, which is converted from a static state (e.g., a high level or a low level) into a toggling state. The controller interface circuit 230 may transmit the data signal DQ including the data DATA to the memory device 100', based on the toggle timings of the data strobe signal DQS.

The controller interface circuit 230 may receive the ready/busy output signal nR/B from the memory device 100' through the eighth pin P28. The controller interface circuit 230 may determine state information of the memory device 100', based on the ready/busy output signal nR/B.

Although not shown in FIG. 6, the memory device 100' may include a plurality of memory cell arrays and the memory interface circuit 106 may provide hard decision data and compressed soft decision data, both obtained from the memory cell arrays, to the memory controller 200' through the seventh pin P17.

Figure 7B:
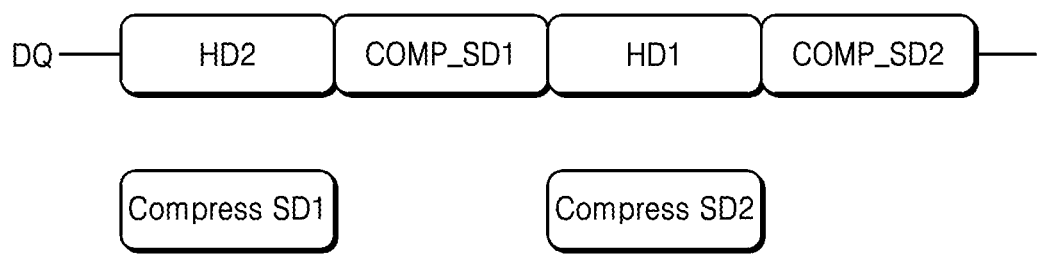

FIGS. 7A and 7B are diagrams illustrating a read operation according to some embodiments.

Referring to FIG. 7A, a memory device 300 may include first and second memory cell arrays 311 and 321, first and second page buffer circuits 312 and 322, first and second compression circuits 313 and 323, and a memory interface circuit 330.

The first page buffer circuit 312 may obtain first hard decision data HD1 and first soft decision data SD1 from the first memory cell array 311. The first compression circuit 313 may generate first compressed data COMP_SD1 by compressing the first soft decision data SD1. The first page buffer circuit 312 may provide the first hard decision data HD1 and the first compressed data COMP_SD1 to the memory interface circuit 330.

The second page buffer circuit 322 may obtain second hard decision data HD2 and second soft decision data SD2 from the second memory cell array 321. The second compression circuit 323 may generate second compressed data COMP_SD2 by compressing the second soft decision data SD2. The second page buffer circuit 322 may provide the second hard decision data HD2 and the second compressed data COMP_SD2 to the memory interface circuit 330.

The memory interface circuit 330 may output the first hard decision data HD1, the second hard decision data HD2, the first compressed data COMP_SD1, and the second compressed data COMP_SD2 through the first to eighth DQ pins DQ0 to DQ7.

Referring to FIG. 7B, while the memory interface circuit 330 is outputting the second hard decision data HD2 through the first to eighth DQ pins DQ0 to DQ7, the first compression circuit 313 may compress the first soft decision data SD1. When the memory interface circuit 330 has completed outputting the second hard decision data HD2, the memory interface circuit 330 may output the first compressed data COMP_SD1 through the first to eighth DQ pins DQ0 to DQ7. When the memory interface circuit 330 has completed outputting the first compressed data COMP_SD1, the memory interface circuit 330 may output the first hard decision data HD1 through the first to eighth DQ pins DQ0 to DQ7. While the memory interface circuit 330 is outputting the first hard decision data HD1 through the first to eighth DQ pins DQ0 to DQ7, the second compression circuit 323 may compress the second soft decision data SD2. When the memory interface circuit 330 has completed outputting the first hard decision data HD1, the memory interface circuit 330 may output the second compressed data COMP_SD2 through the first to eighth DQ pins DQ0 to DQ7.

Because compressed soft decision data is output through the first to eighth DQ pins DQ0 to DQ7, a read time for hard decision data and soft decision data may be reduced.

Figure 8A:
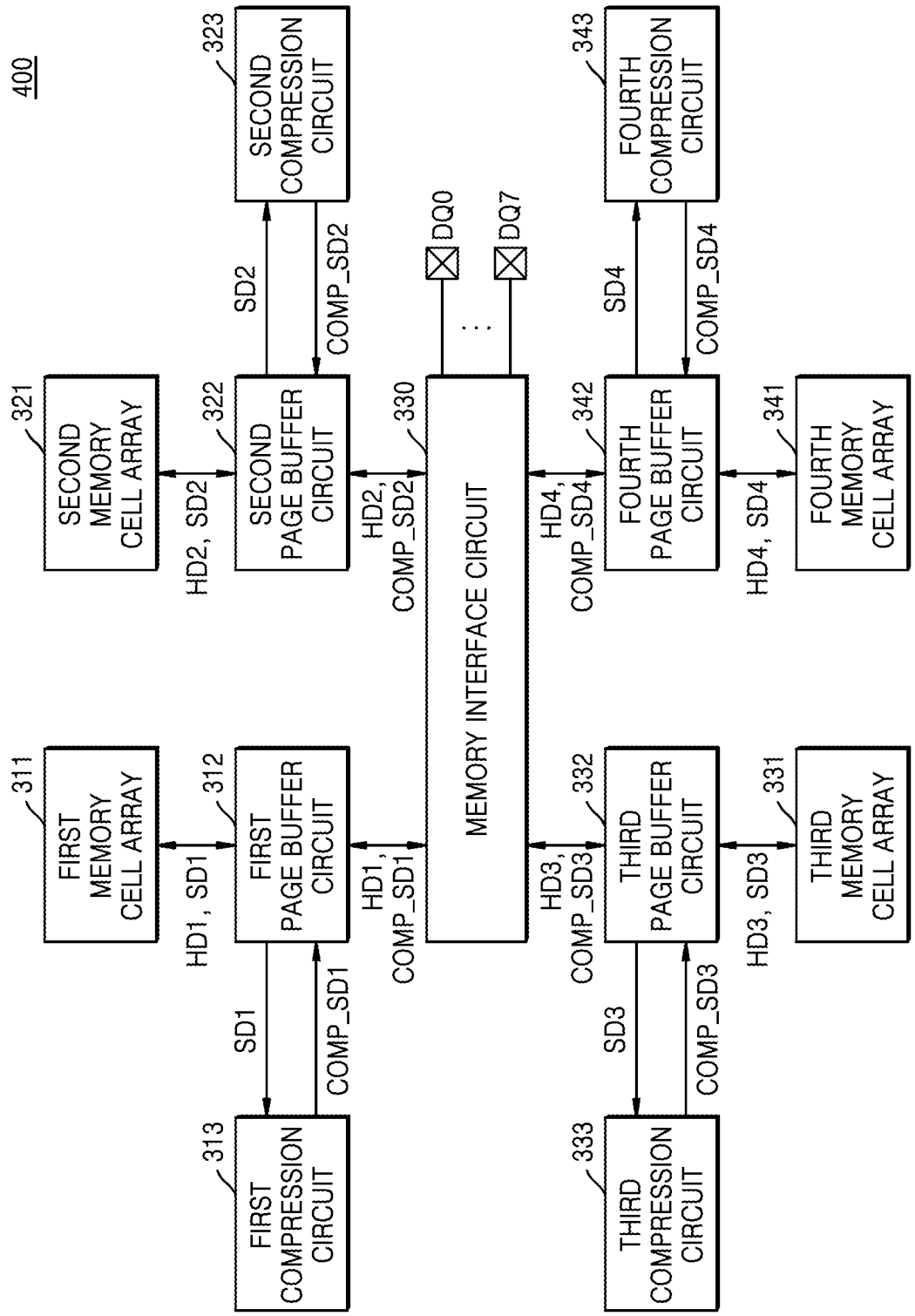
FIGS. 8A and 8B are diagrams illustrating a read operation according to some embodiments.
Figure 8B:
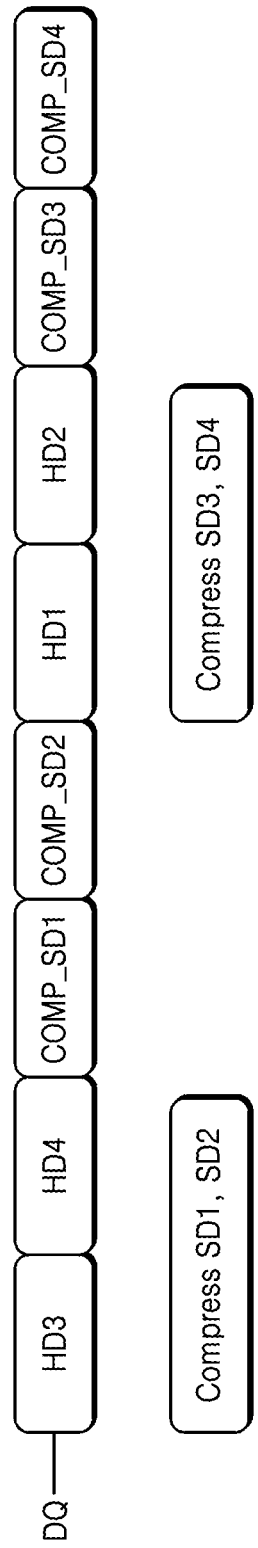

FIGS. 8A and 8B are diagrams illustrating a read operation according to some embodiments.

Compared to the memory device 300 of FIG. 7A, a memory device 400 of FIG. 8A may further include third and fourth memory cell arrays 331 and 341, third and fourth page buffer circuits 332 and 342, and third and fourth compression circuits 333 and 343.

The third page buffer circuit 332 may obtain third hard decision data HD3 and third soft decision data SD3 from the third memory cell array 331. The third compression circuit 333 may generate third compressed data COMP_SD3 by compressing the third soft decision data SD3. The third page buffer circuit 332 may provide the third hard decision data HD3 and the third compressed data COMP_SD3 to the memory interface circuit 330.

The fourth page buffer circuit 342 may obtain fourth hard decision data HD4 and fourth soft decision data SD4 from the fourth memory cell array 341. The fourth compression circuit 343 may generate fourth compressed data COMP_SD4 by compressing the fourth soft decision data SD4. The fourth page buffer circuit 342 may provide the fourth hard decision data HD4 and the fourth compressed data COMP_SD4 to the memory interface circuit 330.

Referring to FIG. 8B, while the memory interface circuit 330 is outputting the third hard decision data HD3 and the fourth hard decision data HD4 through the first to eighth DQ pins DQ0 to DQ7, the first and second compression circuits 313 and 323 may respectively compress the first soft decision data SD1 and the second soft decision data SD2.

When the memory interface circuit 330 has completed outputting the third hard decision data HD3 and the fourth hard decision data HD4, the memory interface circuit 330 may output the first compressed data COMP_SD1 and the second compressed data COMP_SD2.

When the memory interface circuit 330 has completed outputting the first compressed data COMP_SD1 and the second compressed data COMP_SD2, the memory interface circuit 330 may output the first hard decision data HD1 and the second hard decision data HD2. While the memory interface circuit 330 is outputting the first hard decision data HD1 and the second hard decision data HD2 through the first to eighth DQ pins DQ0 to DQ7, the third and fourth compression circuits 333 and 343 may respectively compress the third soft decision data SD3 and the fourth soft decision data SD4.

When the memory interface circuit 330 has completed outputting the first hard decision data HD1 and the second hard decision data HD2, the memory interface circuit 330 may output the third compressed data COMP_SD3 and the fourth compressed data COMP_SD4.

Figure 9:
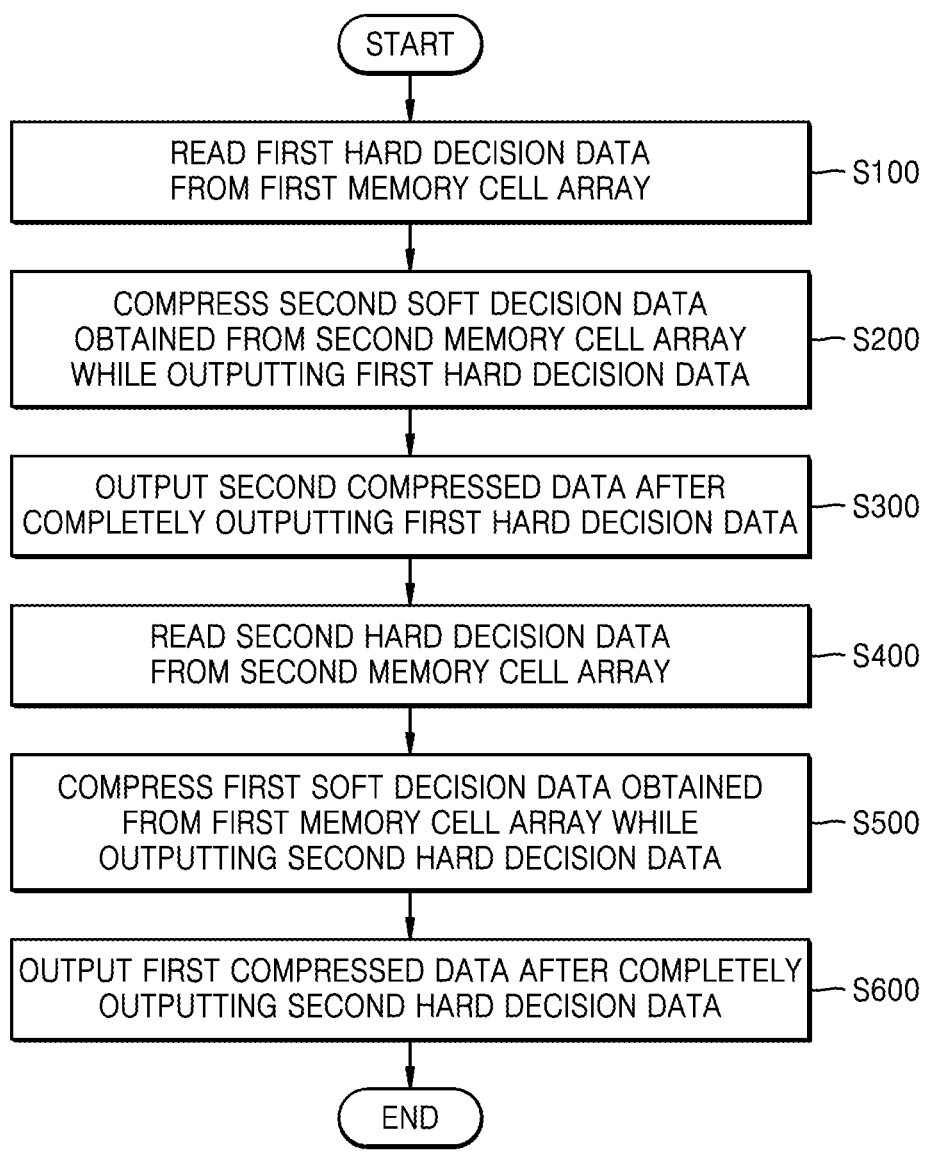
FIG. 9 is a flowchart of an operating method of a memory device according to some embodiments.

FIG. 9 is a flowchart of an operating method of a memory device, according to some embodiments. FIG. 9 may be described with reference to FIG. 7A.

Referring to FIG. 9, the first page buffer circuit 312 may read first hard decision data HD1 from the first memory cell array 311 in operation S100.

While the memory interface circuit 330 is outputting the first hard decision data HD1 through the first to eighth DQ pins DQ0 to DQ7, the second compression circuit 323 may generate second compressed data COMP_SD2 by compressing second soft decision data SD2, which is obtained from the second memory cell array 321, in operation S200.

After the memory interface circuit 330 has completed outputting the first hard decision data HD1, the memory interface circuit 330 may output the second compressed data COMP_SD2 through the first to eighth DQ pins DQ0 to DQ7 in operation S300.

The second page buffer circuit 322 may read second hard decision data HD2 from the second memory cell array 321 in operation S400. In some embodiments, operation S400 may be performed in parallel with operation S300.

While the memory interface circuit 330 is outputting the second hard decision data HD2 through the first to eighth DQ pins DQ0 to DQ7, the first compression circuit 313 may generate first compressed data COMP_SD1 by compressing first soft decision data SD1, which is obtained from the first memory cell array 311, in operation S500.

After the memory interface circuit 330 has completed outputting the second hard decision data HD2, the memory interface circuit 330 may output the first compressed data COMP_SD1 through the first to eighth DQ pins DQ0 to DQ7 in operation S600.

Figure 10:
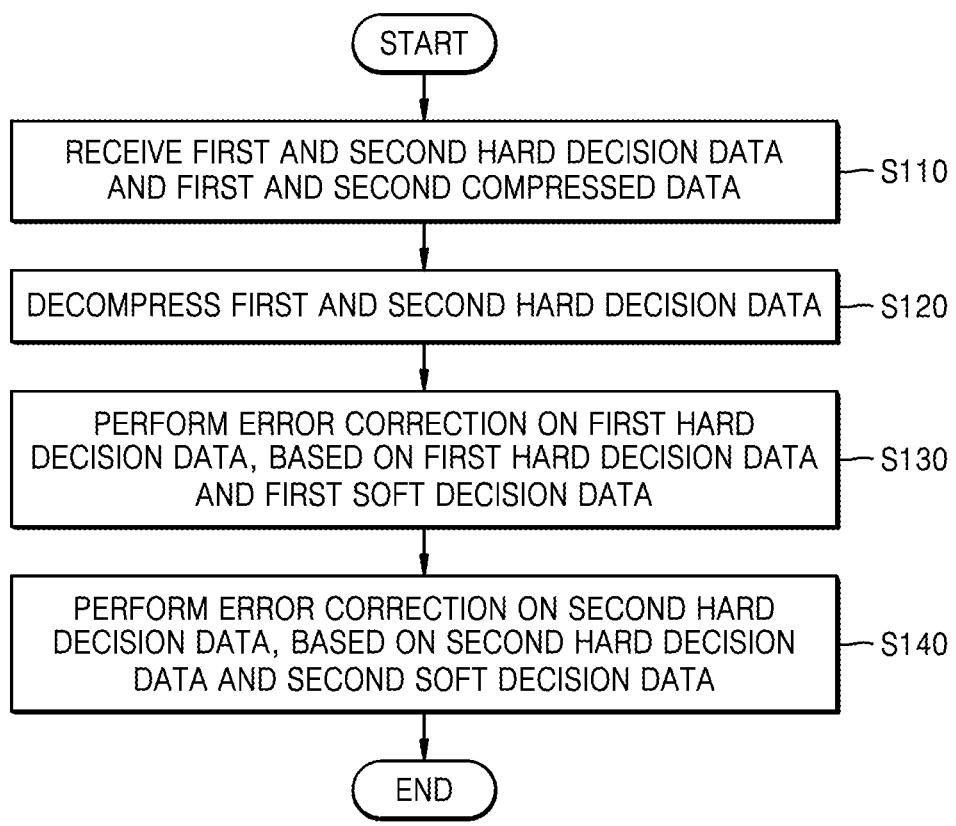
FIG. 10 is a flowchart of an operating method of a memory controller according to some embodiments.

FIG. 10 is a flowchart of an operating method of a memory controller, according to some embodiments. FIG. 10 may be described with reference to FIG. 1 or 7A.

The memory controller 200 may receive first hard decision data HD1, second hard decision data HD2, first compressed data COMP_SD1, and second compressed data COMP_SD2 from the memory device 300 through DQ pins in operation S110.

The decompression circuit 220 of the memory controller 200 may decompress the first compressed data COMP_SD1 and the second compressed data COMP_SD2 in operation S120.

The error correction circuit 210 of the memory controller 200 may perform error correction on the first hard decision data HD1, based on the first hard decision data HD1 and the first soft decision data SD1, in operation S130.

The error correction circuit 210 of the memory controller 200 may perform error correction on the second hard decision data HD2, based on the second hard decision data HD2 and the second soft decision data SD2, in operation S140.

Figure 11A:
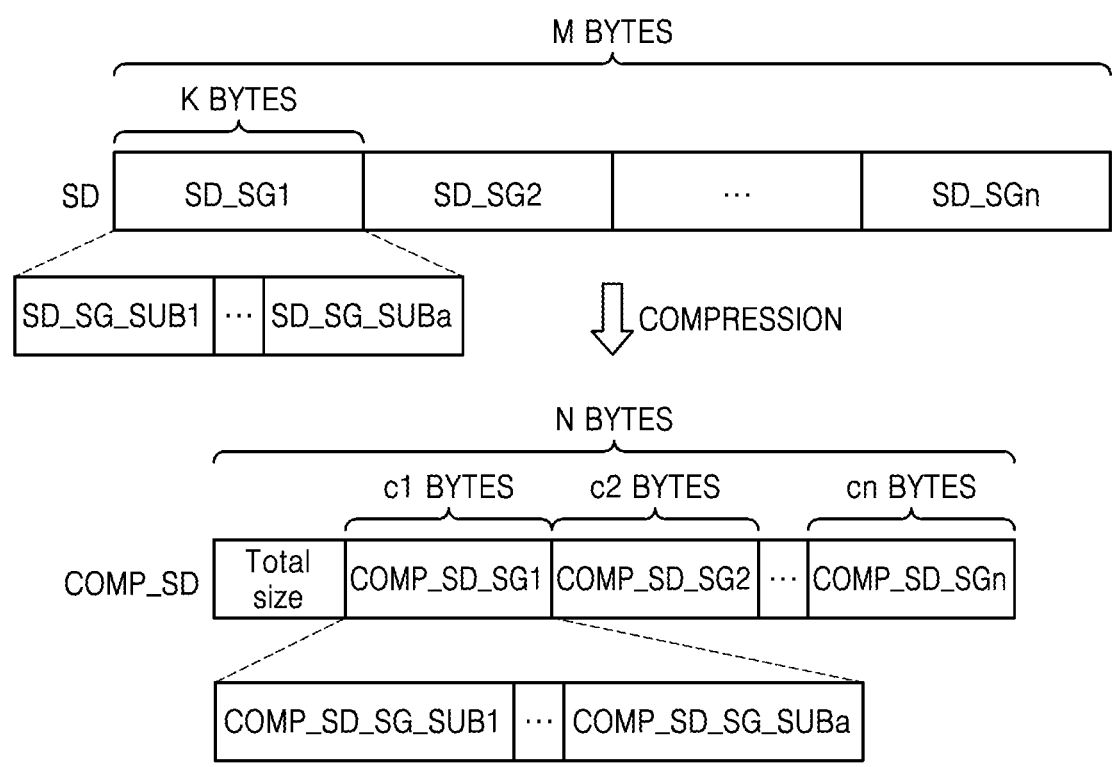
FIGS. 11A and 11B are diagrams illustrating a method of compressing soft decision data according to some embodiments.
Figure 11B:
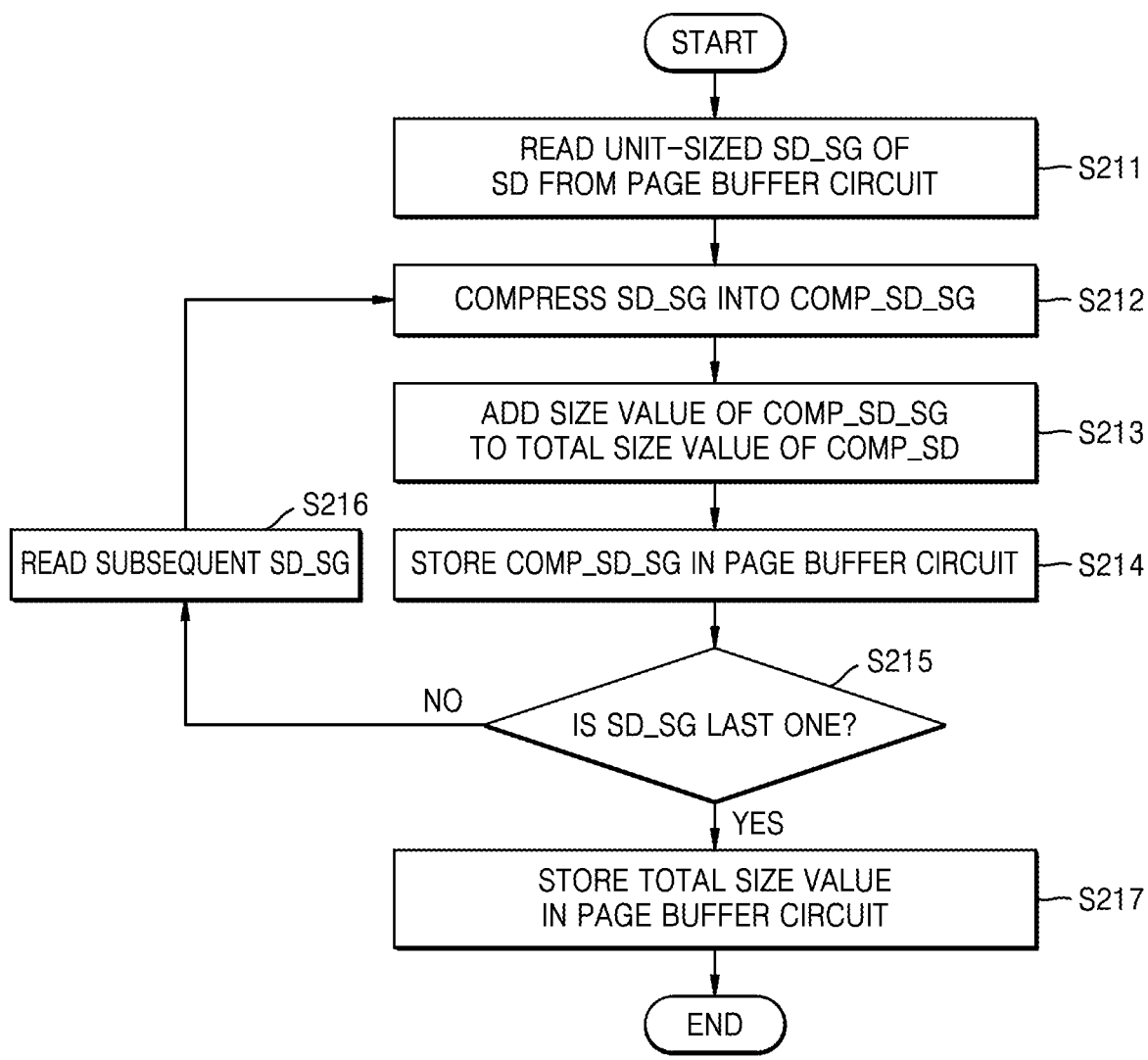

FIGS. 11A and 11B are diagrams illustrating a method of compressing soft decision data, according to some embodiments. FIGS. 11A and 11B may be described with reference to FIGS. 1 and 2.

Referring to FIG. 11A, soft decision data SD may be M bytes in size and may be divided into a plurality of soft decision data segments SD_SG1 to SD_SGn. Here, M may be 16K. The size of each of the soft decision data segments SD_SG1 to SD_SGn may be K bytes less than M bytes. For example, K may be a multiple of 16. Each of the soft decision data segments SD_SG1 to SD_SGn may be divided into a plurality of soft decision data sub segments SD_SG_SUB1 to SD_SG_SUBa. The size of each of the soft decision data sub segments SD_SG_SUB1 to SD_SG_SUBa may be L bytes less than K bytes. For example, L may be 16.

Compressed data COMP_SD may be N bytes in size and may be divided into a plurality of compressed data segments COMP_SD_SG1 to COMP_SD_SGn, where N bytes is less than M bytes. Here, N may be variable according to the degree of compression. N may be variable according to the number of bits indicating a minor value (e.g., "1") in the soft decision data SD. The compressed data segments COMP_SD_SG1 to COMP_SD_SGn may be respectively c1 to cn bytes in size, where c1 to cn may be the same as or different from each other. Each of the compressed data segments COMP_SD_SG1 to COMP_SD_SGn may be divided into a plurality of compressed data sub segments COMP_SD_SG_SUB1 to COMP_SD_SG_SUBa. The soft decision data sub segments SD_SG_SUB1 to SD_SG_SUBa may be respectively compressed into the compressed data sub segments COMP_SD_SG_SUB1 to COMP_SD_SG_SUBa. The size of the compressed data sub segments COMP_SD_SG_SUB1 to COMP_SD_SG_SUBa may vary with a compression rate.

The compression circuit 107 may generate the compressed data segments COMP_SD_SG1 to COMP_SD_SGn by respectively compressing the soft decision data segments SD_SG1 to SD_SGn. In detail, the compression circuit 107 may read one of the soft decision data segments SD_SG1 to SD_SGn and encode the location of a bit indicating a minor value in each of the soft decision data sub segments SD_SG_SUB1 to SD_SG_SUBa of the read soft decision data segment, thereby generating the compressed data sub segments COMP_SD_SG_SUB1 to COMP_SD_SG_SUBa. A method of compressing a soft decision data sub segment, according to some embodiments, may be described in detail with reference to FIGS. 13A to 20 below.

The compression circuit 107 may calculate the sum of the sizes of generated compressed data segments whenever the compression circuit 107 generates one of the compressed data segments COMP_SD_SG1 to COMP_SD_SGn. After the last compressed data segment is generated, the compression circuit 107 may add a total size value of the compressed data COMP_SD to the front end of the compressed data COMP_SD. Referring to FIG. 11A, the total size of the compressed data COMP_SD may be set to the sum of c1 bytes to cn bytes or N bytes obtained by adding the size of bits indicating the total size to the sum of c1 bytes to cn bytes.

Because N corresponding to the size of the compressed data COMP_SD is variable, the decompression circuit 220 of the memory controller 200 may first need to identify the size of the compressed data COMP_SD to decompress the compressed data COMP_SD. Accordingly, the memory controller 200 may identify a total size value and determine that the compressed data COMP_SD is completely received when data of an identified size has been received. The memory controller 200 may increase a decompression speed by decompressing the compressed data COMP_SD after receiving data corresponding to the total size value. A decompression method may be described below with reference to FIGS. 13A, 13B, 20, etc. In addition, increased decompression performance may be provided by accurately identifying the compressed data COMP_SD through the total size value.

Referring to FIG. 11B, the compression circuit 107 may read unit-sized (e.g., K-byte) soft decision data segment SD_SG of soft decision data SD from the page buffer circuit 103 in operation S211.

The compression circuit 107 may compress the soft decision data segment SD_SG into a compressed data segment COMP_SD_SG in operation S212. In detail, the compression circuit 107 may compress soft decision data sub segments SD_SG_SUB1 to SD_SG_SUBa of the soft decision data segment SD_SG. A method of compressing the soft decision data sub segments SD_SG_SUB1 to SD_SG_SUBa, according to some embodiments, may be described in detail with reference to FIGS. 13A to 20 below.

The compression circuit 107 may add a size value of the compressed data segment COMP_SD_SG to a total size value of compressed data COMP_SD in operation S213. The compression circuit 107 may include a register storing the total size value of the compressed data COMP_SD.

The compression circuit 107 may store the compressed data segment COMP_SD_SG in the page buffer circuit 103 in operation S214.

When the soft decision data segment SD_SG is not the last one, that is, in case of NO in S215, the compression circuit 107 may read a subsequent soft decision data segment SD_SG from the page buffer circuit 103 in operation S216. Thereafter, the compression circuit 107 may repeat operations S212 to S214.

When the soft decision data segment SD_SG is the last one, that is, in case of YES in S215, the compression circuit 107 may store the total size value of the compressed data COMP_SD in the page buffer circuit 103 in operation S217.

A plurality of compressed data segments and the total size value, which are stored in the page buffer circuit 103, may be provided as compressed data to the memory controller 200 through the memory interface circuit 106.

Figure 12A:
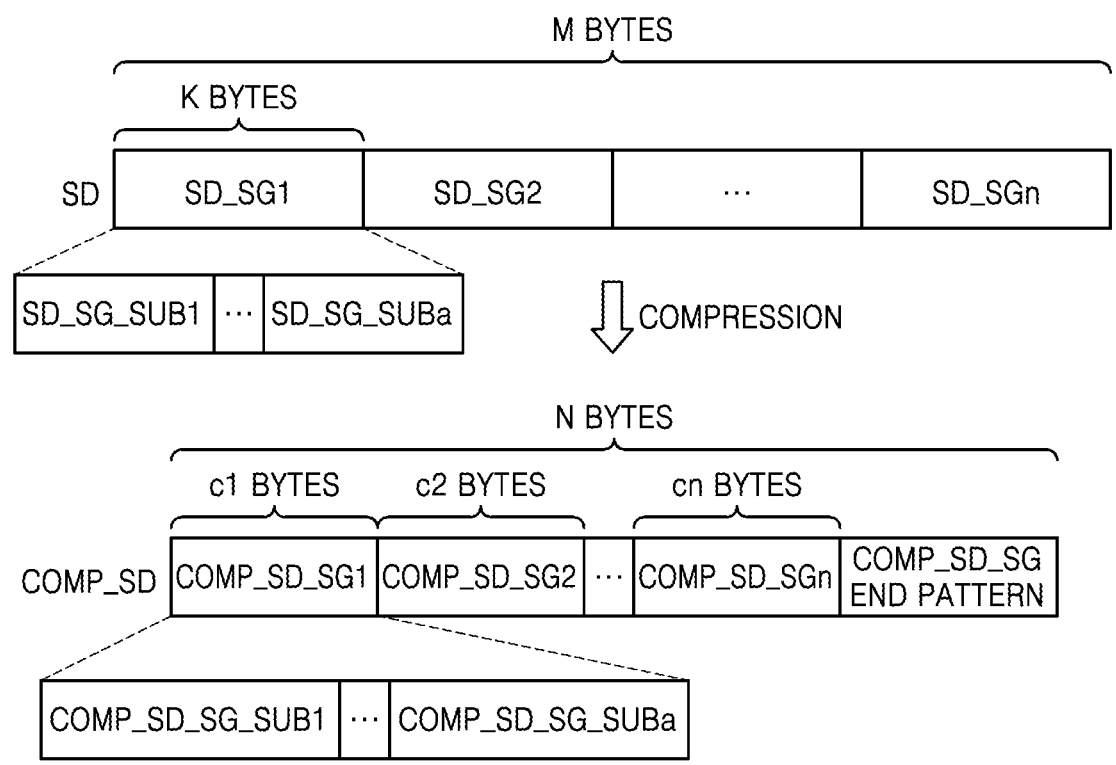
FIGS. 12A and 12B are diagrams illustrating an operating method of a compression circuit according to some embodiments.
Figure 12B:
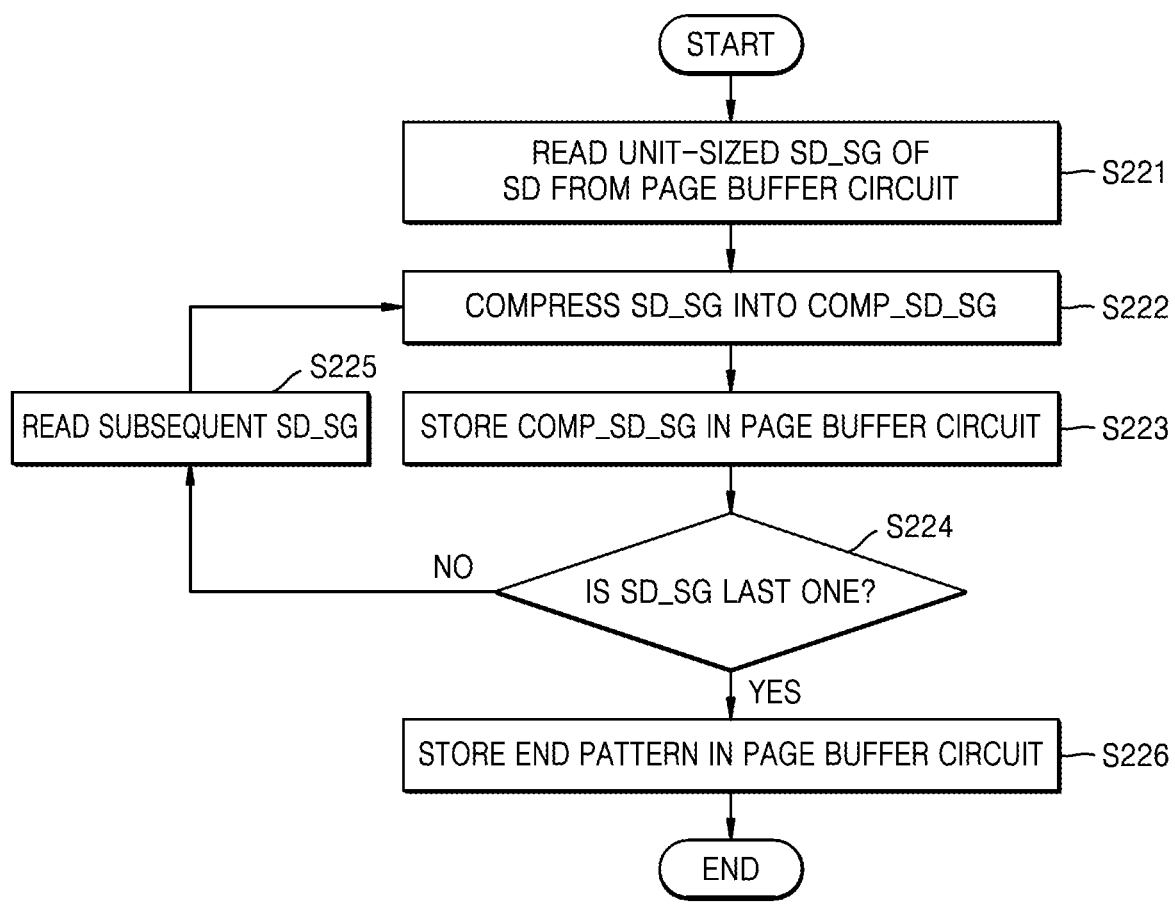

FIGS. 12A and 12B are diagrams illustrating an operating method of a compression circuit, according some embodiments. FIGS. 12A and 12B may be described with reference to FIGS. 1 and 2.

Referring to FIG. 12A compared to FIG. 11A, the compression circuit 107 may generate an end pattern COMP_SD_SG END PATTERN indicating the end of the compressed data COMP_SD after generating the last compressed data segment COMP_SD_SGn. The end pattern COMP_SD_SG END PATTERN may be added to the back end of the last compressed data segment COMP_SD_SGn. The memory controller 200 may identify the end pattern COMP_SD_SG END PATTERN and may determine that the compressed data COMP_SD has been completely received when the end pattern COMP_SD_SG END PATTERN is identified. The memory controller 200 may increase a decompression speed by decompressing the compressed data COMP_SD immediately after receiving the end pattern COMP_SD_SG END PATTERN. In addition, increased decompression performance may be provided by accurately identifying the compressed data COMP_SD through the end pattern COMP_SD_SG END PATTERN.

Referring to FIG. 12B, the compression circuit 107 may read unit-sized (e.g., K-byte) soft decision data segment SD_SG of soft decision data SD from the page buffer circuit 103 in operation S221.

The compression circuit 107 may compress the soft decision data segment SD_SG into a compressed data segment COMP_SD_SG in operation S222.

The compression circuit 107 may store the compressed data segment COMP_SD_SG in the page buffer circuit 103 in operation S223.

When the soft decision data segment SD_SG is not the last one, that is, in case of NO in S224, the compression circuit 107 may read a subsequent soft decision data segment SD_SG from the page buffer circuit 103 in operation S225. Thereafter, the compression circuit 107 may repeat operations S222 and S223.

When the soft decision data segment SD_SG is the last one, that is, in case of YES in S224, the compression circuit 107 may store the end pattern COMP_SD_SG END PATTERN in the page buffer circuit 103 in operation S226.

A plurality of compressed data segments and an end pattern, which are stored in the page buffer circuit 103, may be provided as compressed data to the memory controller 200 through the memory interface circuit 106.

Figure 13A:
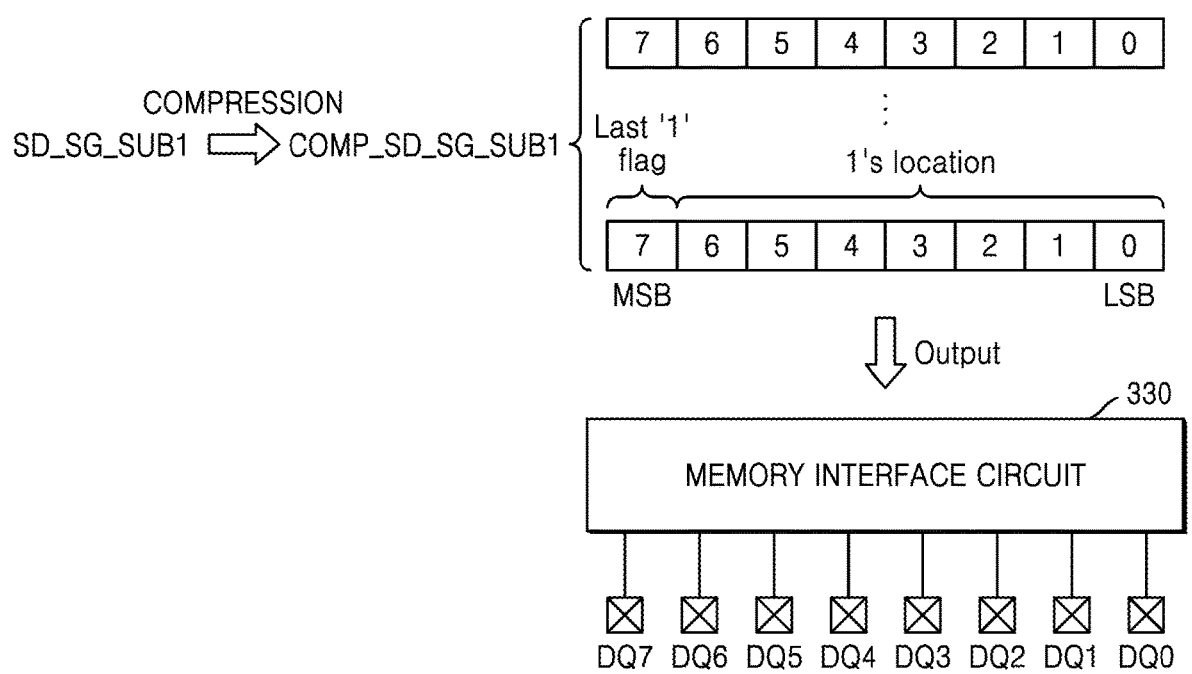
FIGS. 13A and 13B are diagrams illustrating a method of compressing a soft decision data segment according to some embodiments.
Figure 13B:
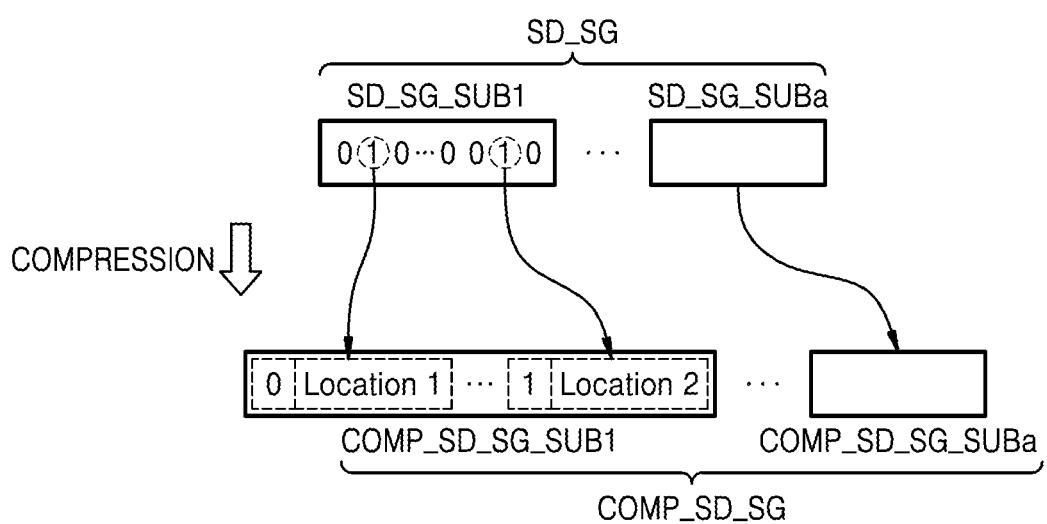

FIGS. 13A and 13B are diagrams illustrating a method of compressing a soft decision data segment, according to some embodiments. FIGS. 13A and 13B may be described with reference to FIG. 2.

Referring to FIG. 13A, the compression circuit 107 may generate a compressed data sub segment COMP_SD_SG_SUB1 by encoding each minor value (e.g., "1"), which is included in a soft decision data sub segment SD_SG_SUB1, into eight bits. In detail, "1" in the soft decision data sub segment SD_SG_SUB1 may be encoded into seven bits, which indicate the location of the bit "1", and one flag bit, which indicates whether the bit "1" is the last "1" in the soft decision data sub segment SD_SG_SUB1. For example, as the last "1" flag, the most significant bit (MSB) corresponding to the eighth DQ pin DQ7 may indicate whether a currently encoded "1" is the last "1" in the soft decision data sub segment SD_SG_SUB1. Seven bits respectively corresponding to the first to seventh DQ pins DQ0 to DQ6 may indicate the location of "1" in the soft decision data sub segment SD_SG_SUB1. For example, when the last "1" in the soft decision data sub segment SD_SG_SUB1 is encoded, the MSB among eight bits of a result of encoding may be "1".

When "1" that is not the last one in the soft decision data sub segment SD_SG_SUB1 is encoded, the MSB among eight bits of a result of encoding may be "0". However, embodiments are not limited thereto. When the last "1" in the soft decision data sub segment SD_SG_SUB1 is encoded, the MSB among eight bits of a result of encoding may be "0". When "1" that is not the last one in the soft decision data sub segment SD_SG_SUB1 is encoded, the MSB among eight bits of a result of encoding may be "1". Because the location of "1" is encoded using seven bits, the size of soft decision data sub segment SD_SG_SUB1 that is encodable may be 2⁷ bits, i.e., 128 bits. Referring to FIG. 13A, an operation of encoding "1" by using eight bits is described because the number of DQ pins of the memory interface circuit 330 is eight. However, embodiments are not limited thereto. "1" in the soft decision data sub segment SD_SG_SUB1 may be encoded using a number of bits corresponding to an integer multiple of the number of DQ pins. Although it has been described that whether "1" is the last "1" is represented with the MSB among eight bits, embodiments are not limited thereto.

A proportion of bits representing "1" in soft decision data may be very low. For example, a proportion of bits representing "1" in soft decision data may be 2%. Accordingly, even when one bit (that is, "1") in soft decision data SD is encoded into eight bits in compressed data COMP_SD, the size of soft decision data SD may be greater than the size of the compressed data COMP_SD.

Referring to FIG. 13B, a soft decision data segment SD_SG may be compressed into a compressed data segment COMP_SD_SG. In detail, soft decision data sub segments SD_SG_SUB1 to SD_SG_SUBa may be respectively compressed into compressed data sub segments COMP_SD_SG_SUB1 to COMP_SD_SG_SUBa. Each of the first "1" and the last "1" in the soft decision data sub segment SD_SG_SUB1 may be encoded into eight bits. According to the encoding rule of FIG. 13A, the MSB corresponding to the first "1" among eight bits may be "0" and the other seven bits may represent a first location. The MSB corresponding to the last "1" among eight bits may be "1" and the other seven bits may represent a second location. The description of the soft decision data sub segment SD_SG_SUB1 may also be applied to the other soft decision data sub segments SD_SG_SUB2 to SD_SG_SUBa.

The memory controller 200 may decode the soft decision data sub segment COMP_SD_SUB1 in units of eight bits and determine the location of "1" in the soft decision data sub segment COMP_SD_SUB1. When the MSB among eight bits is "1", it may indicate the last "1" in the soft decision data sub segment SD_SG_SUB1, and accordingly, a 128-bit soft decision data sub segment SD_SG_SUB1 may be completely decoded by including "0" in locations other than the identified locations of "1".

FIG. 14 is a diagram illustrating a location mapping table according to some embodiments. FIG. 14 may be described with reference to FIG. 2.

The compression circuit 107 may compress a soft decision data sub segment SD_SG_SUB into a compressed data sub segment COMP_SD_SG_SUB by referring to the location mapping table. In detail, the compression circuit 107 may encode "1" in the soft decision data sub segment SD_SG_SUB by referring to the location mapping table.

The length of the soft decision data sub segment SD_SG_SUB may be 128 bits. Eight bits output in parallel to the first to eighth DQ pins DQ0 to DQ7 may form one byte.

Referring to FIG. 14, because the location of the last bit in the soft decision data sub segment SD_SG_SUB is encoded into 0x7F, i.e., 01111111, the locations of 128 bits may be encoded using seven bits as an index. In other words, as described above with reference to FIG. 13A, the compression circuit 107 may represent the location of "1" in the 128-bit soft decision data sub segment SD_SG_SUB with seven bits by referring to the location mapping table.

FIGS. 15A to 15D are diagrams illustrating a method of compressing a soft decision data sub segment, according to some embodiments.

Figure 15A:
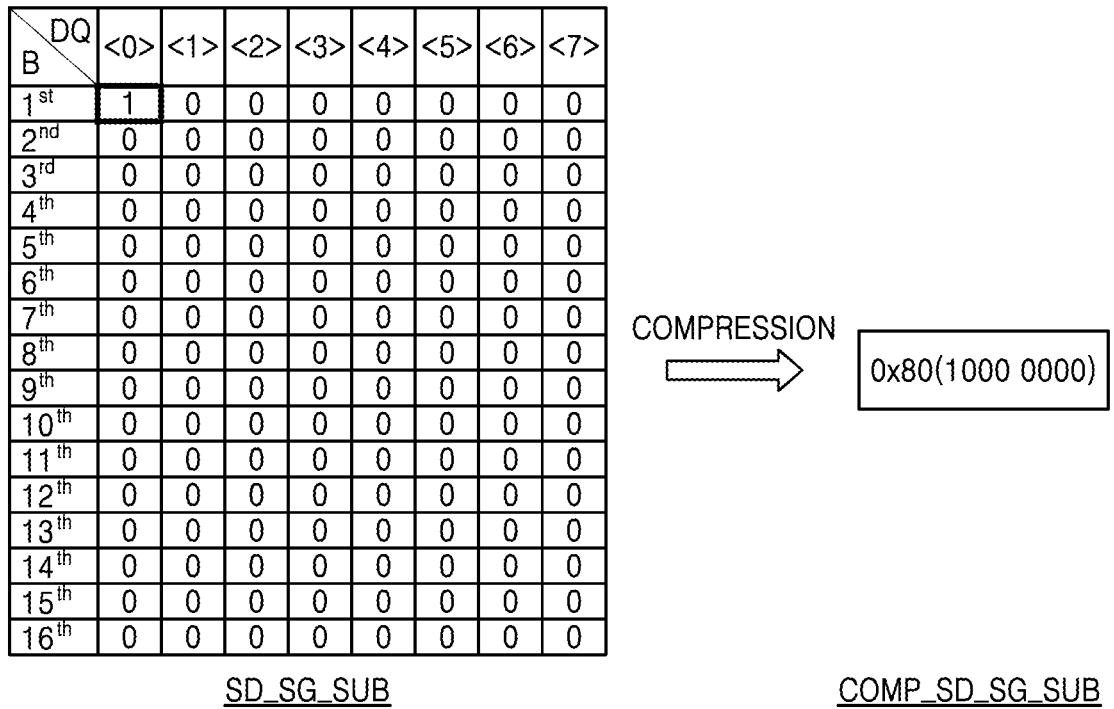

Referring to FIG. 15A, only the first bit in a soft decision data sub segment SD_SG_SUB is "1", which is the last "1" in the soft decision data sub segment SD_SG_SUB. Accordingly, referring to FIG. 13A, the MSB among encoded eight bits may be "1". Referring to FIG. 14, all the other seven bits among the encoded eight bits may be "0". Therefore, "1" in the soft decision data sub segment SD_SG_SUB may be encoded into 0x80, i.e., 10000000. In FIG. 15A, 128 bits of the soft decision data sub segment SD_SG_SUB may be compressed into eight bits of a compressed data sub segment COMP_SD_SG_SUB.

Figure 15B:
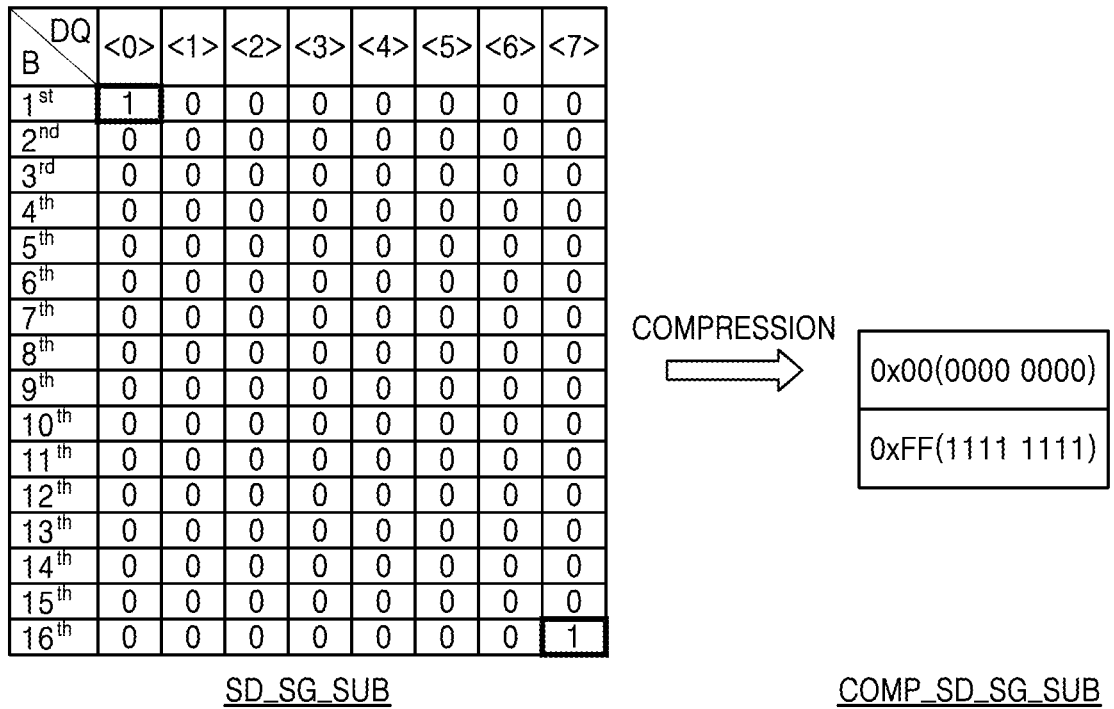

Referring to FIG. 15B, the first and last bits in a soft decision data sub segment SD_SG_SUB are "1". Accordingly, referring to FIGS. 13A and 14, the first "1" may be encoded into 0x00, i.e., 00000000, and the last "1" may be encoded into 0xFF, i.e., 11111111. In FIG. 15B, 128 bits of the soft decision data sub segment SD_SG_SUB may be compressed into 16 bits of a compressed data sub segment COMP_SD_SG_SUB.

Figure 15C:
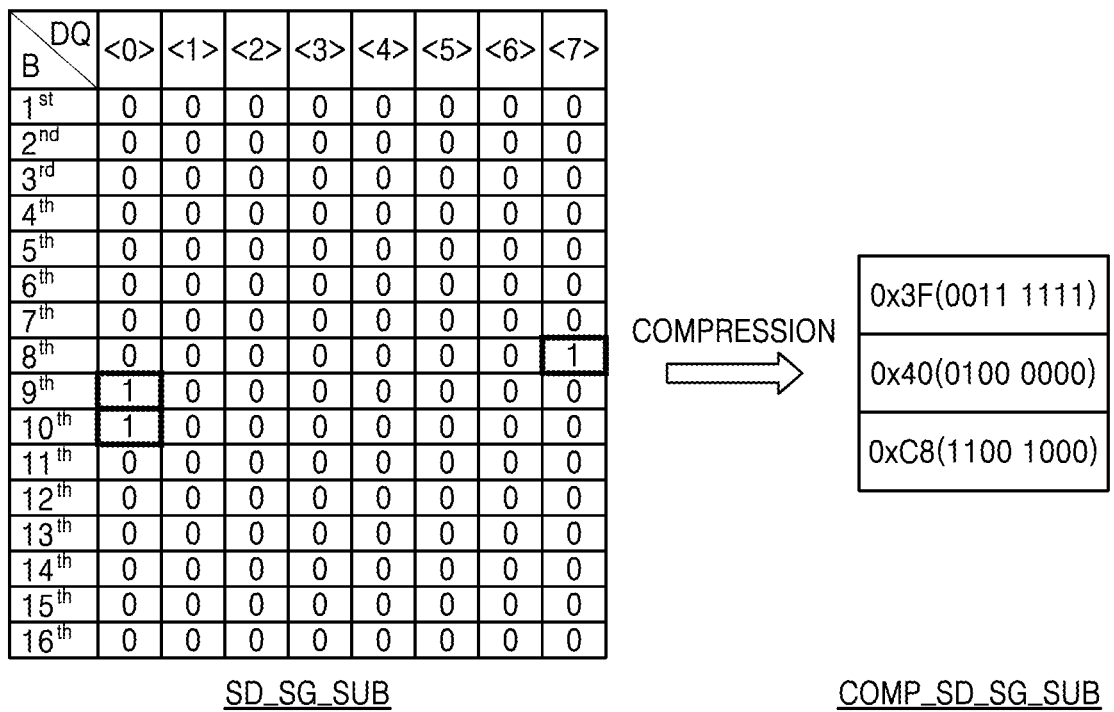

Referring to FIG. 15C, the first "1" in a soft decision data sub segment SD_SG_SUB may be encoded into 0x3F, i.e., 00111111, the second "1" may be encoded into 0x40, i.e., 01000000, and the last "1" may be encoded into 0xC8, i.e., 11001000. In FIG. 15C, 128 bits of the soft decision data sub segment SD_SG_SUB may be compressed into 24 bits of a compressed data sub segment COMP_SD_SG_SUB.

Referring to FIG. 15D, when there is no "1" in a soft decision data sub segment SD_SG_SUB, the soft decision data sub segment SD_SG_SUB may be encoded into 0x7F, i.e., 01111111. Referring to FIGS. 13A and 14, when the last bit in the soft decision data sub segment SD_SG_SUB is "1", the bit "1" may be encoded into 0xFF. Because there is no "1" mapped to 0x7F, 0x7F may be mapped to the case where there is no "1" in the soft decision data sub segment SD_SG_SUB.

Figure 16A:
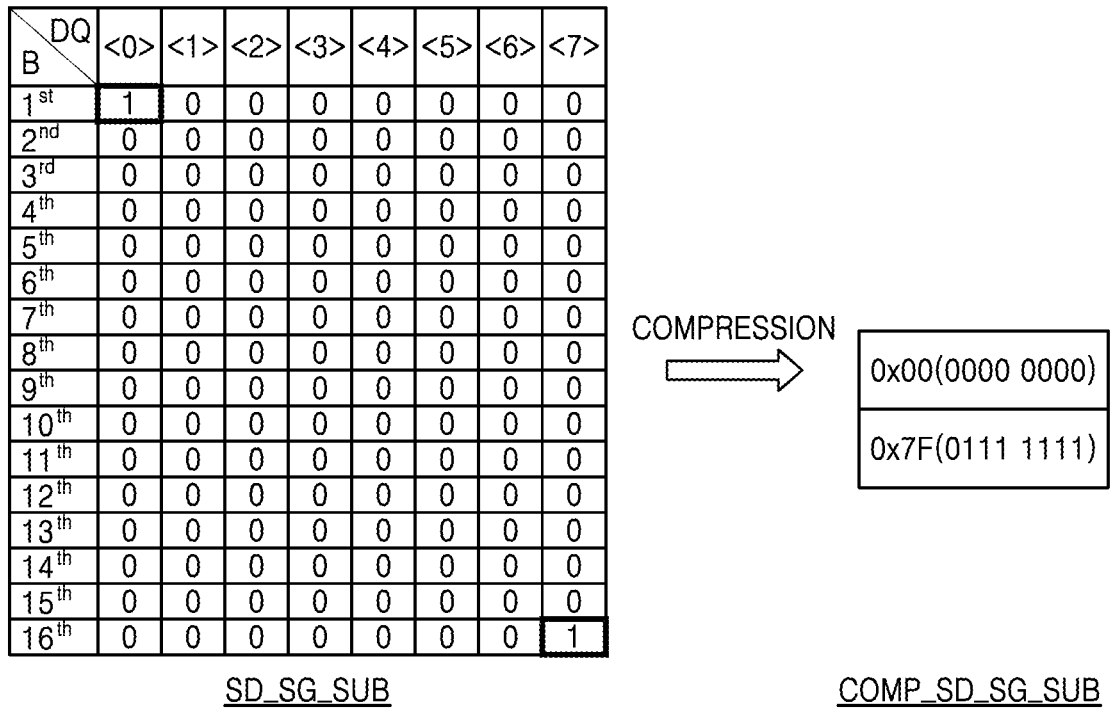

FIGS. 16A and 16B are diagrams illustrating a method of compressing a soft decision data sub segment, according to an embodiment.

Compared to FIG. 15B, referring to FIG. 16A, when the last bit in a soft decision data sub segment SD_SG_SUB is "1", the last bit "1" may be encoded into 0x7F, i.e., 01111111.

Compared to FIG. 15D, referring to FIG. 16B, when there is no "1" in a soft decision data sub segment SD_SG_SUB, the soft decision data sub segment SD_SG_SUB may be encoded into 0xFF, i.e., 11111111.

For convenience of description, the location of "1" in a soft decision data sub segment SD_SG_SUB is represented with bits corresponding to the first to seventh DQ pins DQ0 to DQ6 among eight bits and whether an encoded "1" is the last "1" in the soft decision data sub segment SD_SG_SUB is represented with the MSB among the eight bits, but embodiments are not limited thereto. In other words, a bit representing whether the encoded "1" is the last "1" in the soft decision data sub segment SD_SG_SUB may be arbitrarily selected from among the eight bits.

Figure 17:
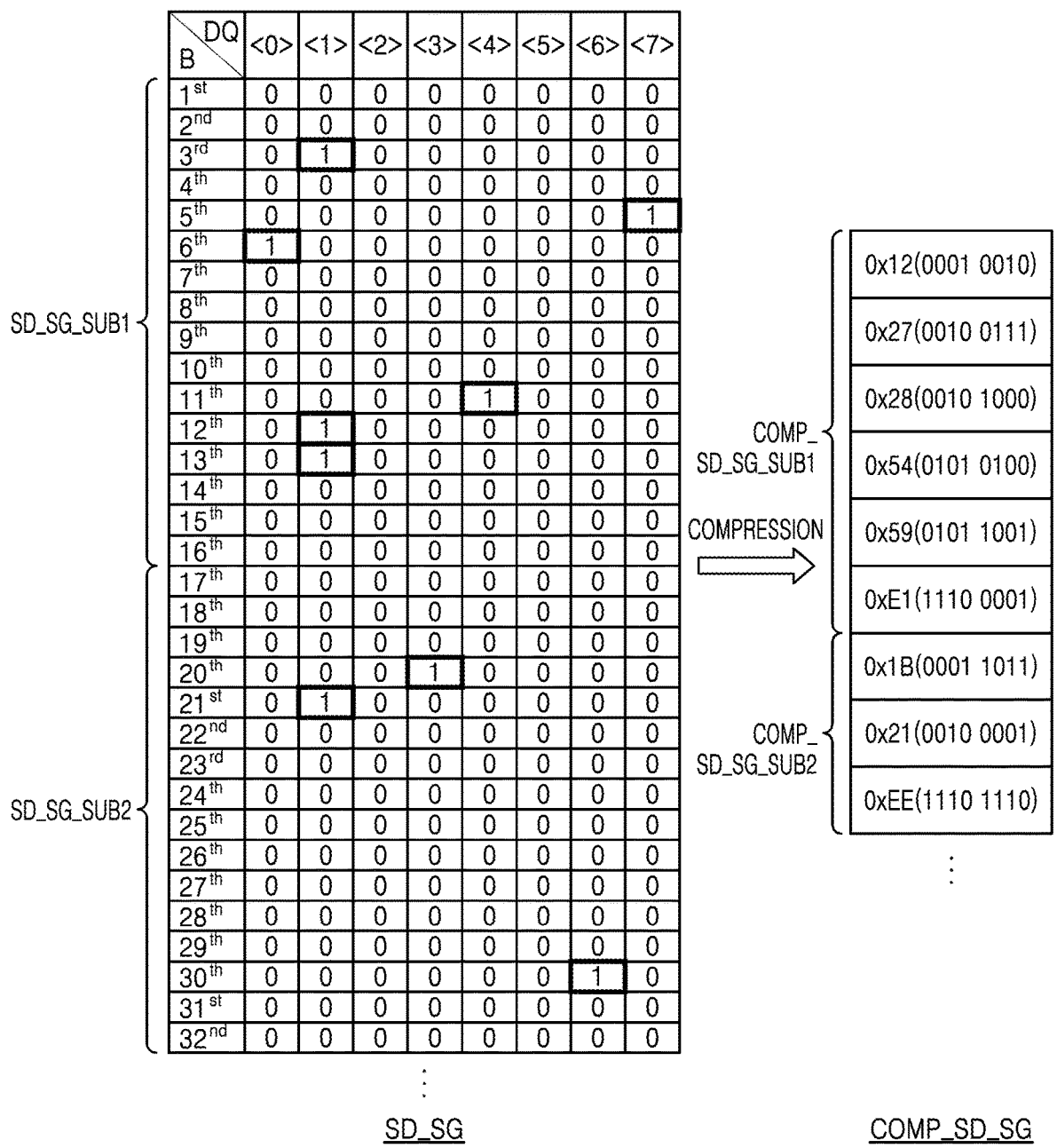
FIG. 17 is a diagram illustrating a method of compressing a soft decision data segment according to some embodiments.

FIG. 17 is a diagram illustrating a method of compressing a soft decision data segment, according to some embodiments. FIG. 17 may be described with reference to FIG. 2.

Referring to FIG. 17, a soft decision data segment SD_SG may include a plurality of soft decision data sub segments SD_SG_SUB1, SD_SG_SUB2, and so on. A compressed data sub segment COMP_SD_SG_SUB may include a plurality of compressed data sub segments COMP_SD_SG_SUB1, COMP_SD_SG_SUB2, and so on.

The compression circuit 107 may generate the compressed data sub segments COMP_SD_SG_SUB1, COMP_SD_SG_SUB2, and so on by compressing the soft decision data sub segments SD_SG_SUB1, SD_SG_SUB2, and so on by using the compression method according to the embodiment of FIGS. 15A to 15D or the embodiment of FIGS. 16A and 16B.

The size of each of the soft decision data sub segments SD_SG_SUB1, SD_SG_SUB2, and so on may be 128 bits. The size of each of the compressed data sub segments COMP_SD_SG_SUB1, COMP_SD_SG_SUB2, and so on may vary with the degree of compression. For example, the size of the compressed data sub segment COMP_SD_SG_SUB1 may be 48 bits and the size of the compressed data sub segment COMP_SD_SG_SUB2 may be 24 bits.

The memory controller 200 may obtain the soft decision data sub segment SD_SG_SUB1 by decompressing the compressed data sub segment COMP_SD_SG_SUB1 and may obtain the soft decision data sub segment SD_SG_SUB2 by decompressing the compressed data sub segment COMP_SD_SG_SUB2.

Figure 18A:
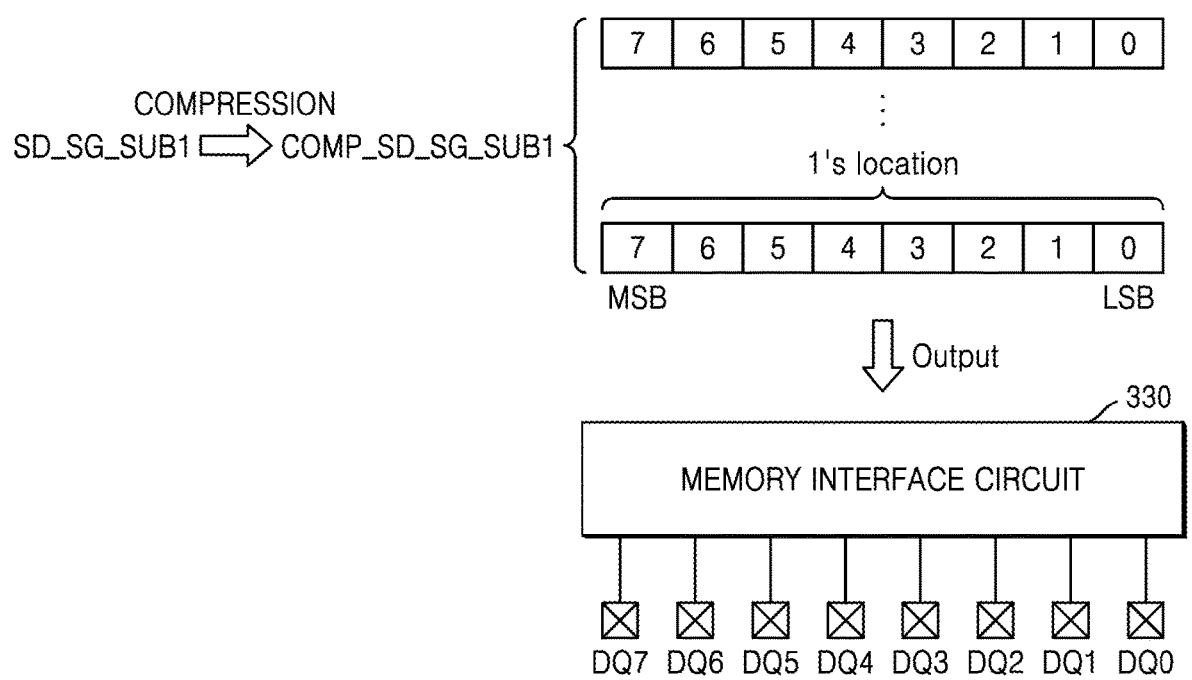
FIGS. 18A and 18B are diagrams illustrating a method of compressing a soft decision data sub segment according to some embodiments.
Figure 18B:
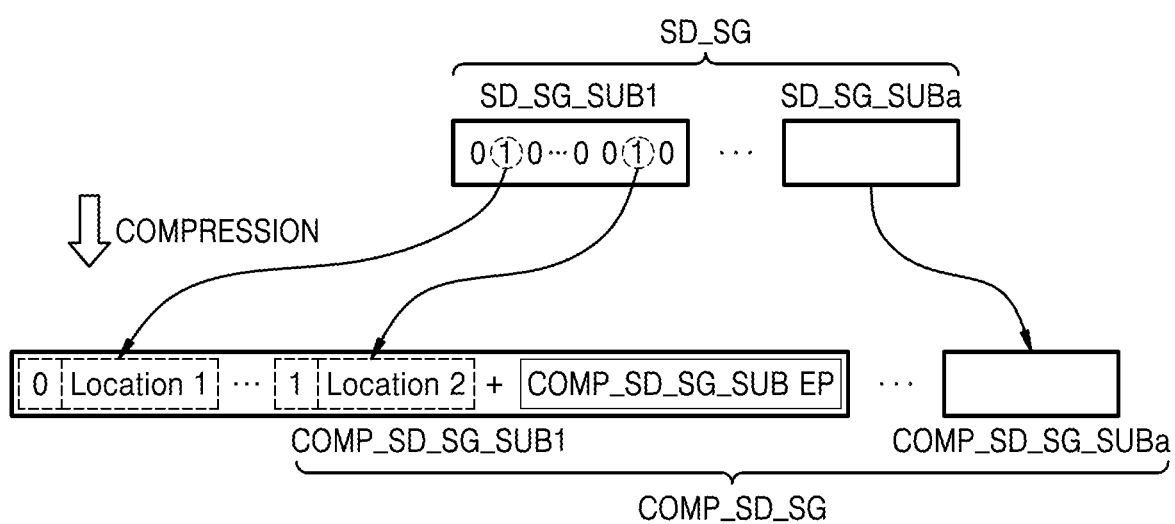

FIGS. 18A and 18B are diagrams illustrating a method of compressing a soft decision data sub segment, according to some embodiments.

Referring to FIG. 18A, "1" in a soft decision data sub segment SD_SG_SUB1 may be encoded into eight bits.

In detail, a bit "1" in the soft decision data sub segment SD_SG_SUB1 may be encoded into eight bits representing the location of the bit "1". Because the location of "1" is encoded using eight bits, the size of an encodable soft decision data sub segment SD_SG_SUB1 may be $2^8$ bits, i.e., 256 bits.

In the embodiment of FIGS. 13A and 13B, the compression circuit 107 may indicate the last "1" in the soft decision data sub segment SD_SG_SUB1 by using the MSB among eight bits. The memory controller 200 may use the MSB among the decoded eight bits to identify the last "1" in the soft decision data sub segment SD_SG_SUB1. However, embodiments are not limited thereto. The last "1" in the soft decision data sub segment SD_SG_SUB1 may be identified using any one of the eight bits.

Unlike FIGS. 13A and 13B, referring to FIG. 18B, the compression circuit 107 may add a compressed data sub segment end pattern COMP_SD_SG_SUB EP to the back end of the compressed data sub segment COMP_SD_SG_SUB1 such that the last "1" in the soft decision data sub segment SD_SG_SUB1 is identified. The memory controller 200 may identify the last "1" in a soft decision data sub segment SD_SG_SUB1 by detecting a compressed data sub segment end pattern COMP_SD_SG_SUB EP. The description of the soft decision data sub segment SD_SG_SUB1 may also be applied to the other soft decision data sub segments SD_SG_SUB2 to SD_SG_SUBa.

FIG. 19 is a diagram illustrating a location mapping table according to some embodiments. FIG. 19 may be described with reference to FIG. 2.

The compression circuit 107 may compress a soft decision data sub segment SD_SG_SUB into a compressed data sub segment COMP_SD_SG_SUB by referring to the location mapping table. In detail, the compression circuit 107 may encode "1" in the soft decision data sub segment SD_SG_SUB by referring to the location mapping table.

The length of the soft decision data sub segment SD_SG_SUB may be 256 bits. Eight bits respectively and sequentially output to the first to eighth DQ pins DQ0 to DQ7 may form one byte.

Referring to FIG. 19, because the location of the last bit in the soft decision data sub segment SD_SG_SUB is encoded into 0xFF, i.e., 11111111, the locations of 256 bits may be encoded using eight bits as an index. In other words, as described above with reference to FIG. 18A, the compression circuit 107 may represent the location of "1" with eight bits by referring to the location mapping table.

Figure 20:
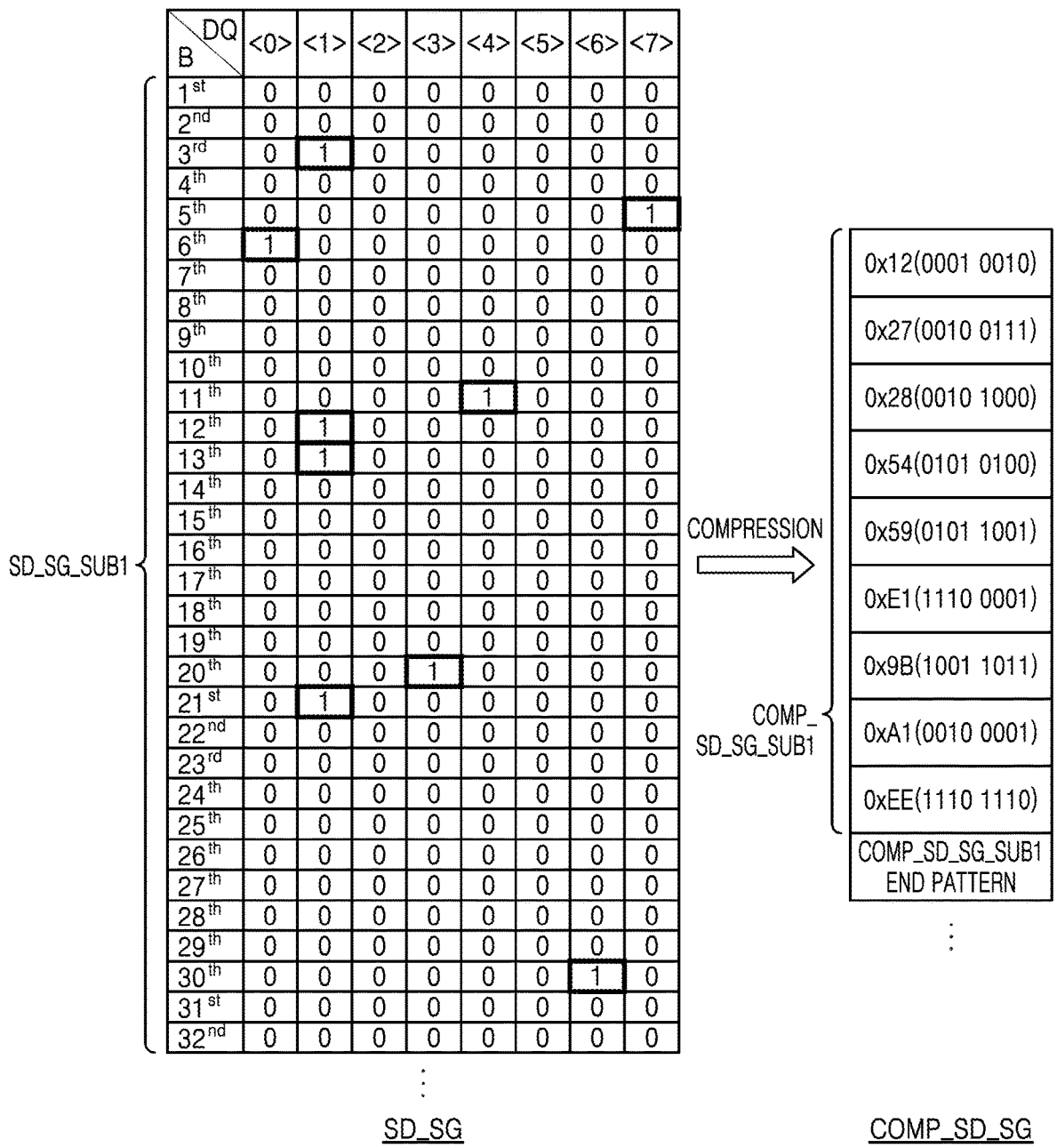
FIG. 20 is a diagram illustrating a method of compressing a soft decision data segment according to some embodiments.

FIG. 20 is a diagram illustrating a method of compressing a soft decision data segment, according to some embodiments.

Referring to FIG. 20, a soft decision data segment SD_SG may include a plurality of soft decision data sub segments SD_SG_SUB1 and so on. A compressed data segment COMP_SD_SG may include a plurality of compressed data sub segments COMP_SD_SG_SUB1 and so on.

The compression circuit 107 may generate the compressed data sub segments COMP_SD_SG_SUB1 and so on by compressing the soft decision data sub segments SD_SG_SUB1 and so on according to the compression method of the embodiment of FIGS. 8A and 8B.

The size of each of the soft decision data sub segments SD_SG_SUB1 and so on may be 256 bits. The size of each of the compressed data sub segments COMP_SD_SG_SUB1 and so on may vary with the degree of compression. For example, the size of each of the compressed data sub segments COMP_SD_SG_SUB1 and so on may be 36 bits. The size of a compressed data sub segment end pattern COMP_SD_SG_SUB1 END PATTERN may vary with an end pattern.

The memory controller 200 may determine the size of the compressed data sub segment COMP_SD_SG_SUB1 by identifying the compressed data sub segment end pattern COMP_SD_SG_SUB1 END PATTERN and may obtain the soft decision data sub segment SD_SG_SUB1 by decoding the compressed data sub segment COMP_SD_SG_SUB1 in units of eight bits.

Figure 21:
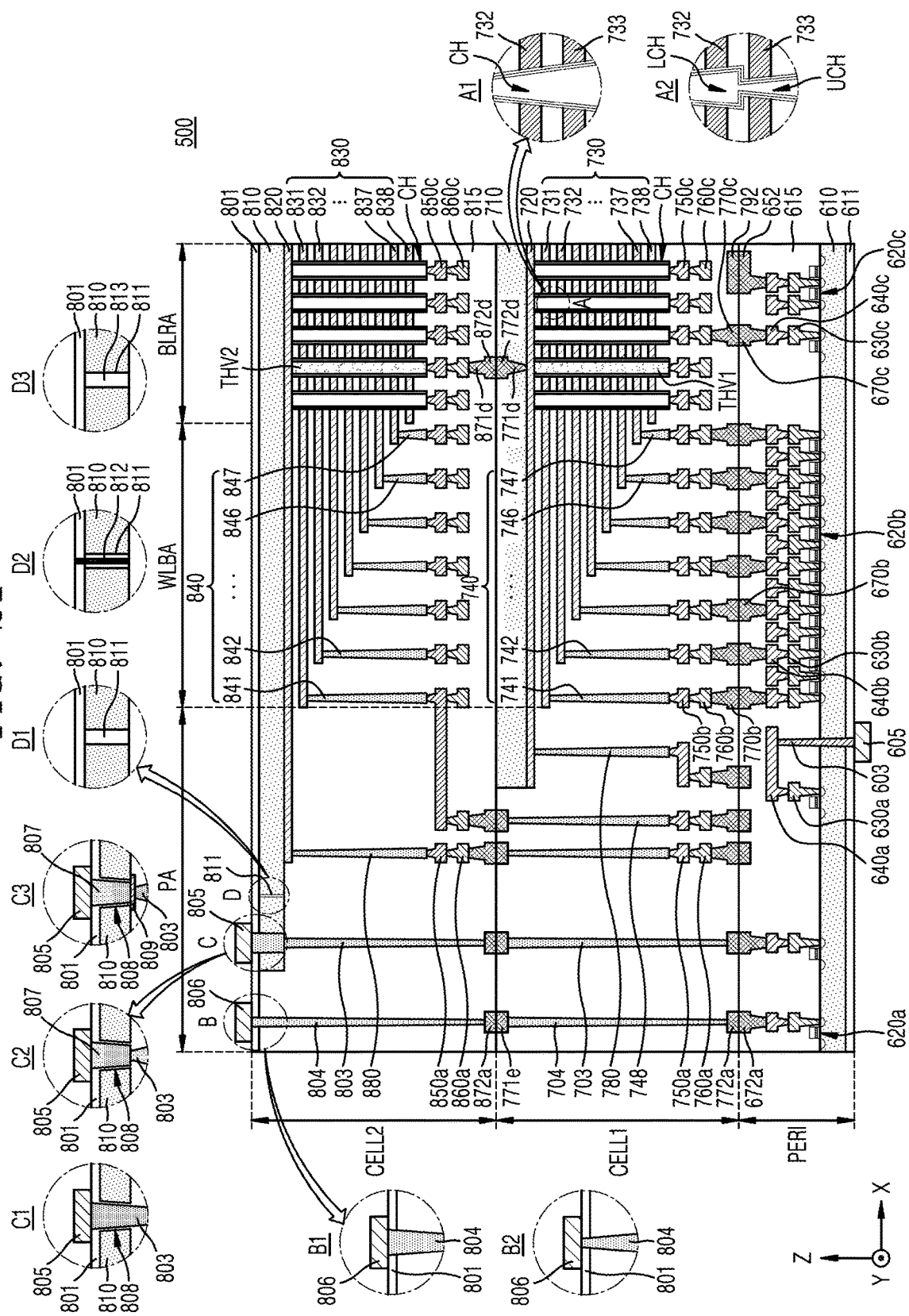
FIG. 21 is a view illustrating a memory device according to some embodiments.

FIG. 21 is a view illustrating a memory device 500 according to some embodiments.

Referring to FIG. 21, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. In other embodiments, the bonding metal patterns may be formed of aluminum (Al) and/or tungsten (W).

The memory device 500 may include the at least one upper chip including the cell region. For example, as illustrated in FIG. 21, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 21. However, embodiments of the inventive concepts are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 610 and a plurality of circuit elements 620a, 620b and 620c formed on the first substrate 610. An interlayer insulating layer 615 including one or more insulating layers may be provided on the plurality of circuit elements 620a, 620b and 620c, and a plurality of metal lines electrically connected to the plurality of circuit elements 620a, 620b and 620c may be provided in the interlayer insulating layer 615. For example, the plurality of metal lines may include first metal lines 630a, 630b and 630c connected to the plurality of circuit elements 620a, 620b and 620c, and second metal lines 640a, 640b and 640c formed on the first metal lines 630a, 630b and 630c. The plurality of metal lines may be formed of at least one of various conductive materials. For example, the first metal lines 630a, 630b and 630c may be formed of tungsten having a relatively high electrical resistivity, and the second metal lines 640a, 640b and 640c may be formed of copper having a relatively low electrical resistivity.

The first metal lines 630a, 630b and 630c and the second metal lines 640a, 640b and 640c are illustrated and described in the present embodiments. However, embodiments of the inventive concepts are not limited thereto. In certain embodiments, at least one or more additional metal lines may further be formed on the second metal lines 640a, 640b and 640c. In this case, the second metal lines 640a, 640b and 640c may be formed of aluminum, and at least some of the additional metal lines formed on the second metal lines 640a, 640b and 640c may be formed of copper having an electrical resistivity lower than that of aluminum of the second metal lines 640a, 640b and 640c.

The interlayer insulating layer 615 may be disposed on the first substrate 610 and may include an insulating material such as silicon oxide and/or silicon nitride.

Each of the first and second cell regions CELL1 and CELL2 may include at least one memory block. The first cell region CELL1 may include a second substrate 710 and a common source line 720. A plurality of word lines 730 (731 to 738) may be stacked on the second substrate 710 in a direction (i.e., the Z-axis direction) perpendicular to a top surface of the second substrate 710. String selection lines and a ground selection line may be disposed on and under the word lines 730, and the plurality of word lines 730 may be disposed between the string selection lines and the ground selection line. Likewise, the second cell region CELL2 may include a third substrate 810 and a common source line 820, and a plurality of word lines 830 (831 to 838) may be stacked on the third substrate 810 in a direction (i.e., the Z-axis direction) perpendicular to a top surface of the third substrate 810. Each of the second substrate 710 and the third substrate 810 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 710 to penetrate or extend through the word lines 730, the string selection lines, and the ground selection line. The channel structure CH may include a data storage layer, a channel layer, and a filling insulation layer. The channel layer may be electrically connected to a first metal line 750c and a second metal line 760c in the bit line bonding region BLBA. For example, the second metal line 760c may be a bit line and may be connected to the channel structure CH through the first metal line 750c. The bit line 760c may extend in a first direction (e.g., a Y-axis direction) parallel to the top surface of the second substrate 710.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 710 to penetrate or extend through the common source line 720 and lower word lines 731 and 732. The lower channel LCH may include a data storage layer, a channel layer, and a filling insulation layer and may be connected to the upper channel UCH. The upper channel UCH may penetrate or extend through upper word lines 733 to 738. The upper channel UCH may include a data storage layer, a channel layer, and a filling insulation layer, and the channel layer of the upper channel UCH may be electrically connected to the first metal line 750c and the second metal line 760c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 732 and 733 adjacent to the boundary between the lower channel LCH and the upper channel UCH may be the dummy word lines. In this case, data may not be stored in memory cells connected to the dummy word line. In other embodiments, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 731 and 732 penetrated by the lower channel LCH is less than the number of the upper word lines 733 to 738 penetrated by the upper channel UCH in the region 'A2'. However, embodiments of the inventive concepts are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 21, the first through-electrode THV1 may penetrate the common source line 720 and the plurality of word lines 730. In certain embodiments, the first through-electrode THV1 may further penetrate the second substrate 710. The first through-electrode THV1 may include a conductive material. In other embodiments, the first through-electrode THV1 may include a conductive material at least partially surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 772d and a second through-metal pattern 872d. The first through-metal pattern 772d may be formed at a bottom end of the first upper chip including the first cell region CELL1, and the second through-metal pattern 872d may be formed at a top end of the second upper chip including the second cell region CELL2. The first through-electrode THV1 may be electrically connected to the first metal line 750c and the second metal line 760c. A lower via 771d may be formed between the first through-electrode THV1 and the first through-metal pattern 772d, and an upper via 871d may be formed between the second through-electrode THV2 and the second through-metal pattern 872d. The first through-metal pattern 772d and the second through-metal pattern 872d may be connected to each other by the bonding method.

In addition, in the bit line bonding region BLBA, an upper metal pattern 652 may be formed in an uppermost metal layer of the peripheral circuit region PERI, and an upper metal pattern 792 having the same shape as the upper metal pattern 652 may be formed in an uppermost metal layer of the first cell region CELL1. The upper metal pattern 792 of the first cell region CELL1 and the upper metal pattern 652 of the peripheral circuit region PERI may be electrically connected to each other by the bonding method. In the bit line bonding region BLBA, the bit line 760c may be electrically connected to a page buffer included in the peripheral circuit region PERI. For example, some of the circuit elements 620c of the peripheral circuit region PERI may constitute the page buffer, and the bit line 760c may be electrically connected to the circuit elements 620c constituting the page buffer through an upper bonding metal pattern 770c of the first cell region CELL1 and an upper bonding metal pattern 670c of the peripheral circuit region PERI.

Referring continuously to FIG. 21, in the word line bonding region WLBA, the word lines 730 of the first cell region CELL1 may extend in a second direction (e.g., an X-axis direction) parallel to the top surface of the second substrate 710 and may be connected to a plurality of cell contact plugs 740 (741 to 747). First metal lines 750b and second metal lines 760b may be sequentially connected onto the cell contact plugs 740 connected to the word lines 730. In the word line bonding region WLBA, the cell contact plugs 740 may be connected to the peripheral circuit region PERI through upper bonding metal patterns 770b of the first cell region CELL1 and upper bonding metal patterns 670b of the peripheral circuit region PERI.

The cell contact plugs 740 may be electrically connected to a row decoder included in the peripheral circuit region PERI. For example, some of the circuit elements 620b of the peripheral circuit region PERI may constitute the row decoder, and the cell contact plugs 740 may be electrically connected to the circuit elements 620b constituting the row decoder through the upper bonding metal patterns 770b of the first cell region CELL1 and the upper bonding metal patterns 670b of the peripheral circuit region PERI. In some embodiments, an operating voltage of the circuit elements 620b constituting the row decoder may be different from an operating voltage of the circuit elements 620c constituting the page buffer. For example, the operating voltage of the circuit elements 620c constituting the page buffer may be greater than the operating voltage of the circuit elements 620b constituting the row decoder.

Likewise, in the word line bonding region WLBA, the word lines 830 of the second cell region CELL2 may extend in the second direction (e.g., the X-axis direction) parallel to the top surface of the third substrate 810 and may be connected to a plurality of cell contact plugs 840 (841 to 847). The cell contact plugs 840 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 770b may be formed in the first cell region CELL1, and the upper bonding metal patterns 670b may be formed in the peripheral circuit region PERI. The upper bonding metal patterns 770b of the first cell region CELL1 and the upper bonding metal patterns 670b of the peripheral circuit region PERI may be electrically connected to each other by the bonding method. The upper bonding metal patterns 770b and the upper bonding metal patterns 670b may be formed of aluminum, copper, and/or tungsten.

In the external pad bonding region PA, a lower metal pattern 771e may be formed in a lower portion of the first cell region CELL1, and an upper metal pattern 872a may be formed in an upper portion of the second cell region CELL2. The lower metal pattern 771e of the first cell region CELL1 and the upper metal pattern 872a of the second cell region CELL2 may be connected to each other by the bonding method in the external pad bonding region PA. Likewise, an upper metal pattern 772a may be formed in an upper portion of the first cell region CELL1, and an upper metal pattern 672a may be formed in an upper portion of the peripheral circuit region PERI. The upper metal pattern 772a of the first cell region CELL1 and the upper metal pattern 672a of the peripheral circuit region PERI may be connected to each other by the bonding method.

Common source line contact plugs 780 and 880 may be disposed in the external pad bonding region PA. The common source line contact plugs 780 and 880 may be formed of a conductive material such as a metal, a metal compound, and/or doped polysilicon. The common source line contact plug 780 of the first cell region CELL1 may be electrically connected to the common source line 720, and the common source line contact plug 880 of the second cell region CELL2 may be electrically connected to the common source line 820. A first metal line 750a and a second metal line 760a may be sequentially stacked on the common source line contact plug 780 of the first cell region CELL1, and a first metal line 850a and a second metal line 860a may be sequentially stacked on the common source line contact plug 880 of the second cell region CELL2.

Input/output pads 605, 805 and 806 may be disposed in the external pad bonding region PA. Referring to FIG. 21, a lower insulating layer 611 may cover a bottom surface of the first substrate 610, and a first input/output pad 605 may be formed on the lower insulating layer 611. The first input/output pad 605 may be connected to at least one of a plurality of the circuit elements 620a disposed in the peripheral circuit region PERI through a first input/output contact plug 603 and may be separated from the first substrate 610 by the lower insulating layer 611. In addition, a side insulating layer may be disposed between the first input/output contact plug 603 and the first substrate 610 to electrically isolate the first input/output contact plug 603 from the first substrate 610.

An upper insulating layer 801 at least partially covering a top surface of the third substrate 810 may be formed on the third substrate 810. A second input/output pad 805 and/or a third input/output pad 806 may be disposed on the upper insulating layer 801. The second input/output pad 805 may be connected to at least one of the plurality of circuit elements 620a disposed in the peripheral circuit region PERI through second input/output contact plugs 803 and 703, and the third input/output pad 806 may be connected to at least one of the plurality of circuit elements 620a disposed in the peripheral circuit region PERI through third input/output contact plugs 804 and 704.

In some embodiments, the third substrate 810 may not be disposed in a region in which the input/output contact plug is disposed. For example, as illustrated in a region 'B', the third input/output contact plug 804 may be separated from the third substrate 810 in a direction parallel to the top surface of the third substrate 810 and may penetrate or extend through an interlayer insulating layer 815 of the second cell region CELL2 to connect to the third input/output pad 806. In this case, the third input/output contact plug 804 may be formed by at least one of various processes.

In some embodiments, as illustrated in a region 'B1', the third input/output contact plug 804 may extend in a third direction (e.g., the Z-axis direction), and a diameter of the third input/output contact plug 804 may become progressively greater toward the upper insulating layer 801. In other words, a diameter of the channel structure CH described in the region 'A1' may become progressively less toward the upper insulating layer 801, but the diameter of the third input/output contact plug 804 may become progressively greater toward the upper insulating layer 801. For example, the third input/output contact plug 804 may be formed after the second cell region CELL2 and the first cell region CELL1 are bonded to each other by the bonding method.

In certain embodiments, as illustrated in a region 'B2', the third input/output contact plug 804 may extend in the third direction (e.g., the Z-axis direction), and a diameter of the third input/output contact plug 804 may become progressively less toward the upper insulating layer 801. In other words, like the channel structure CH, the diameter of the third input/output contact plug 804 may become progressively less toward the upper insulating layer 801. For example, the third input/output contact plug 804 may be formed together with the cell contact plugs 840 before the second cell region CELL2 and the first cell region CELL1 are bonded to each other.

In certain embodiments, the input/output contact plug may overlap with the third substrate 810. For example, as illustrated in a region 'C', the second input/output contact plug 803 may penetrate or extend through the interlayer insulating layer 815 of the second cell region CELL2 in the third direction (e.g., the Z-axis direction) and may be electrically connected to the second input/output pad 805 through the third substrate 810. In this case, a connection structure of the second input/output contact plug 803 and the second input/output pad 805 may be realized by various methods.

In some embodiments, as illustrated in a region 'C1', an opening 808 may be formed to penetrate the third substrate 810, and the second input/output contact plug 803 may be connected directly to the second input/output pad 805 through the opening 808 formed in the third substrate 810. In this case, as illustrated in the region 'C1', a diameter of the second input/output contact plug 803 may become progressively greater toward the second input/output pad 805. However, embodiments of the inventive concepts are not limited thereto, and in certain embodiments, the diameter of the second input/output contact plug 803 may become progressively less toward the second input/output pad 805.

In certain embodiments, as illustrated in a region 'C2', the opening 808 penetrating or extending through the third substrate 810 may be formed, and a contact 807 may be formed in the opening 808. An end of the contact 807 may be connected to the second input/output pad 805, and another end of the contact 807 may be connected to the second input/output contact plug 803. Thus, the second input/output contact plug 803 may be electrically connected to the second input/output pad 805 through the contact 807 in the opening 808. In this case, as illustrated in the region 'C2', a diameter of the contact 807 may become progressively greater toward the second input/output pad 805, and a diameter of the second input/output contact plug 803 may become progressively less toward the second input/output pad 805. For example, the second input/output contact plug 803 may be formed together with the cell contact plugs 840 before the second cell region CELL2 and the first cell region CELL1 are bonded to each other, and the contact 807 may be formed after the second cell region CELL2 and the first cell region CELL1 are bonded to each other.

In certain embodiments illustrated in a region 'C3', a stopper 809 may further be formed on a bottom end of the opening 808 of the third substrate 810, as compared with the embodiments of the region 'C2'. The stopper 809 may be a metal line formed in the same layer as the common source line 820. Alternatively, the stopper 809 may be a metal line formed in the same layer as at least one of the word lines 830. The second input/output contact plug 803 may be electrically connected to the second input/output pad 805 through the contact 807 and the stopper 809.

Like the second and third input/output contact plugs 803 and 804 of the second cell region CELL2, a diameter of each of the second and third input/output contact plugs 703 and 704 of the first cell region CELL1 may become progressively less toward the lower metal pattern 771e or may become progressively greater toward the lower metal pattern 771c.

Meanwhile, in some embodiments, a slit 811 may be formed in the third substrate 810. For example, the slit 811 may be formed at a certain position of the external pad bonding region PA. For example, as illustrated in a region 'D', the slit 811 may be located between the second input/output pad 805 and the cell contact plugs 840 when viewed in a plan view. Alternatively, the second input/output pad 805 may be located between the slit 811 and the cell contact plugs 840 when viewed in a plan view.

In some embodiments, as illustrated in a region 'D1', the slit 811 may be formed to penetrate or extend through the third substrate 810. For example, the slit 811 may be used to prevent or inhibit the third substrate 810 from being finely cracked when the opening 808 is formed. However, embodiments of the inventive concepts are not limited thereto, and in certain embodiments, the slit 811 may be formed to have a depth ranging from about 60% to about 70% of a thickness of the third substrate 810.

In certain embodiments, as illustrated in a region 'D2', a conductive material 812 may be formed in the slit 811. For example, the conductive material 812 may be used to discharge a leakage current occurring in driving of the circuit elements in the external pad bonding region PA to the outside. In this case, the conductive material 812 may be connected to an external ground line.

In certain embodiments, as illustrated in a region 'D3', an insulating material 813 may be formed in the slit 811. For example, the insulating material 813 may be used to electrically isolate the second input/output pad 805 and the second input/output contact plug 803 disposed in the external pad bonding region PA from the word line bonding region WLBA. Since the insulating material 813 is formed in the slit 811, it may be possible to prevent or reduce the likelihood of a voltage provided through the second input/output pad 805 from affecting a metal layer disposed on the third substrate 810 in the word line bonding region WLBA.

Meanwhile, in certain embodiments, the first to third input/output pads 605, 805 and 806 may be selectively formed. For example, the memory device 500 may be realized to include only the first input/output pad 605 disposed on the first substrate 610, to include only the second input/output pad 805 disposed on the third substrate 810, or to include only the third input/output pad 806 disposed on the upper insulating layer 801.

In some embodiments, at least one of the second substrate 710 of the first cell region CELL1 or the third substrate 810 of the second cell region CELL2 may be used as a sacrificial substrate and may be completely or partially removed before or after a bonding process. An additional layer may be stacked after the removal of the substrate. For example, the second substrate 710 of the first cell region CELL1 may be removed before or after the bonding process of the peripheral circuit region PERI and the first cell region CELL1, and then, an insulating layer at least partially covering a top surface of the common source line 720 or a conductive layer for connection may be formed. Likewise, the third substrate 810 of the second cell region CELL2 may be removed before or after the bonding process of the first cell region CELL1 and the second cell region CELL2, and then, the upper insulating layer 801 at least partially covering a top surface of the common source line 820 or a conductive layer for connection may be formed.

The memory cell array 102 of FIG. 2 may be disposed on the first cell region CELL1 and/or the second cell region CELL2.

The memory cell array 102 of FIG. 2 may be included in the first cell region CELL1 or the second cell region CELL2, and other circuits included in the non-volatile memory device 10 may be included in the peripheral circuit region PERI.

While embodiments of the inventive concept has been particularly shown and described with reference to embodiments thereof, it will be understood that various changes in form and details may be made therein without departing from the spirit and scope of the following claims.

What is claimed is:

1. A memory device comprising:
a first memory cell array and a second memory cell array;
a first page buffer and a second page buffer configured to read data from the first memory cell array and the second memory cell array, respectively; and
a first compression circuit configured to compress first soft decision data into first compressed data by encoding a location of a bit having a first value among bits of the first soft decision data, the first soft decision data being obtained from the first memory cell array by using a plurality of soft read voltages, wherein:
the first compression circuit is further configured to compress the first soft decision data into the first compressed data using N bits while second hard decision data is being output, the second hard decision data being read from the second memory cell array by using a hard read voltage, where N is a natural number of at least 2;
N−1 bits among the N bits represent the location of the bit having the first value among $2^{N-1}$ bits; and
a remaining one bit among the N bits represents whether the bit having the first value is a last bit having the first value among the $2^{N-1}$ bits.

2. The memory device of claim 1, further comprising
a memory interface circuit configured to output the second hard decision data or the first compressed data through N input/output pins,
wherein the first compression circuit is further configured to encode the location of the bit having the first value by using N or fewer bits.

3. The memory device of claim 2, wherein
the first compression circuit is further configured to compress the first soft decision data in units of $2^{N-1}$ bits by using the N bits.

4. The memory device of claim 3, wherein,
when there is no bit having the first value among the $2^{N-1}$ bits,
the $2^{N-1}$ bits are compressed into N−1 bits having the first values and one bit having a second value.

5. The memory device of claim 3, wherein
a last bit among the $2^{N-1}$ bits is compressed into N−1 bits having the first value and one bit having a second value when the last bit among the $2^{N-1}$ bits has the first value, and
the $2^{N-1}$ bits are compressed into N bits having the first value when there is no bit having the first value among the $2^{N-1}$ bits.

6. The memory device of claim 1, wherein the first compression circuit is further configured to add information to a front end of the first compressed data, the information indicating a size of the first compressed data.

7. The memory device of claim 1, wherein the first compression circuit is further configured to add a pattern to a back end of the first compressed data, the pattern indicating an end of the first compressed data.

8. The memory device of claim 1, further comprising
a second compression circuit configured to compress second soft decision data into second compressed data by encoding a location of a bit having the first value among bits of the second soft decision data, the second soft decision data being obtained from the second memory cell array by using the plurality of soft read voltages,
wherein the second compression circuit is further configured to compress the second soft decision data into the second compressed data while first hard decision data is being output, the first hard decision data being read from the first memory cell array by using the hard read voltage.

9. An operating method of a memory device, the operating method comprising:
- reading first hard decision data from a first memory cell array;
- generating second compressed data by compressing second soft decision data obtained from a second memory cell array, while outputting the first hard decision data through an input/output (I/O) pin;
- outputting the second compressed data through the I/O pin after outputting the first hard decision data;
- reading second hard decision data from the second memory cell array;
- generating first compressed data by compressing first soft decision data obtained from the first memory cell array, while outputting the second hard decision data through the I/O pin; and
- outputting the first compressed data through the I/O pin after outputting the second hard decision data.

10. The operating method of claim 9, wherein
the generating of the first compressed data comprises compressing the first soft decision data in units of $2^{N-1}$ bits by using N bits, where N is a natural number,
wherein the compressing of the first soft decision data in units of $2^{N-1}$ bits comprises:
- encoding a location of a bit having a first value by using N−1 bits among the N bits; and
- encoding whether the bit having the first value is a last bit having the first value among the $2^{N-1}$ bits by using a remaining one bit among the N bits.

11. The operating method of claim 9, wherein
the generating of the first compressed data comprises compressing the first soft decision data in units of $2^N$ bits by using N bits, where N is a natural number,
wherein the compressing of the first soft decision data in units of $2^N$ bits comprises
encoding a location of a bit having a first value by using N bits.

12. The operating method of claim 11, wherein the compressing of the first soft decision data in units of $2^N$ bits further comprises adding an end pattern to compressed data resulting from compressing the $2^N$ bits, the end pattern indicating completion of the compression of the $2^N$ bits.

13. The operating method of claim 9, wherein
the generating of the first compressed data comprises adding information to a front end of the first compressed data, the information indicating a size of the first compressed data.

14. The operating method of claim 9, wherein
the generating of the first compressed data comprises adding a pattern to a back end of the first compressed data, the pattern indicating an end of the first compressed data.

15. A memory system comprising:
- a memory device configured to generate second compressed data by compressing second soft decision data obtained from a second memory cell array, while outputting first hard decision data read from a first memory cell array, output the second compressed data after outputting the first hard decision data, generate first compressed data by compressing first soft decision data obtained from the first memory cell array, while outputting second hard decision data read from the second memory cell array, and output the first compressed data after outputting the second hard decision data; and
- a memory controller configured to receive the first hard decision data, the second hard decision data, the first compressed data, and the second compressed data, obtain the first soft decision data by decompressing the first compressed data, correct an error in the first hard decision data based on the first hard decision data and the first soft decision data, and correct an error in the second hard decision data based on the second hard decision data and the second soft decision data.

16. The memory system of claim 15, wherein
the memory device is further configured to compress the first soft decision data in units of $2^{N-1}$ bits by using N bits, where N is a natural number,
wherein N−1 bits among the N bits represent a location of a bit having a first value among the $2^{N-1}$ bits, and
a remaining one bit among the N bits represents whether the bit having the first value is a last bit having the first value among the $2^{N-1}$ bits.

17. The memory system of claim 15, wherein the memory device is further configured to compress the first soft decision data in units of $2^N$ bits by using N bits, where N is a natural number,
wherein the N bits represent a location of a bit having a first value among the $2^N$ bits.

18. The memory system of claim 17, wherein the memory device is further configured to add an end pattern to compressed data resulting from compressing the $2^N$ bits, the end pattern indicating completion of the compression of the $2^N$ bits.

* * * * *